United States Patent
Yamamoto

(10) Patent No.: US 9,424,331 B2
(45) Date of Patent: *Aug. 23, 2016

(54) PARTITIONING SORTED DATA SETS

(71) Applicant: EMPIRE TECHNOLOGY DEVELOPMENT LLC, Wilmington, DE (US)

(72) Inventor: Noboru Yamamoto, Koriyama (JP)

(73) Assignee: EMPIRE TECHNOLOGY DEVELOPMENT LLC, Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 14/728,740

(22) Filed: Jun. 2, 2015

(65) Prior Publication Data
US 2015/0261841 A1    Sep. 17, 2015

Related U.S. Application Data

(63) Continuation of application No. 13/703,657, filed as application No. PCT/US2012/051922 on Aug. 22, 2012, now Pat. No. 9,092,469.

(51) Int. Cl.
G06F 17/30 (2006.01)
G06F 7/00 (2006.01)
G06F 7/32 (2006.01)

(52) U.S. Cl.
CPC ........... *G06F 17/30584* (2013.01); *G06F 7/32* (2013.01); *G06F 17/30312* (2013.01); *G06F 17/30345* (2013.01); *G06F 17/30486* (2013.01); *G06F 17/30613* (2013.01); *G06F 17/30864* (2013.01)

(58) Field of Classification Search
CPC ............. G06F 17/30864; G06F 17/30321; G06F 17/30613; G06F 17/30961; G06F 17/30067

USPC .......................................................... 707/741
See application file for complete search history.

(56) References Cited

U.S. PATENT DOCUMENTS 5,297,207 A    3/1994   Degele
6,366,911 B1*  4/2002   Christy ..................... G06F 7/36
                                                  707/737

(Continued)

FOREIGN PATENT DOCUMENTS

JP        4171835 B2      10/2008
JP        2009-199439 A    9/2009

OTHER PUBLICATIONS

Nadathur Satish et al., "Designing Efficient Sorting Algorithms for Manycore GPUs" IEEE International Parallel and Distributed Processing Symposium, Sep. 2008, pp. 1-10.

Daniel J. Abadi, "Data Management in the Cloud: Limitations and Opportunities" IEEE Computer Society Technical Committee on Data Engineering, 2009, pp. 1-10.

(Continued)

*Primary Examiner* — Usmaan Saeed
*Assistant Examiner* — Raquel Perez-Arroyo
(74) *Attorney, Agent, or Firm* — Maschoff Brennan

(57) ABSTRACT

Techniques described herein generally relate to processing data sets. The data sets can each include multiple indexed data values that can be partitioned into first and second portions. Each data value in each of the first portions of the data sets may have a greater magnitude than each data value in each of the second portions of the data sets. The first portions and second portions of the data values can be further processed by either different processors, or different processor cores as may be desirable.

21 Claims, 15 Drawing Sheets

(56) References Cited

U.S. PATENT DOCUMENTS

| | | | |
|---|---|---|---|
| 7,526,425 B2 | 4/2009 | Marchisio et al. | |
| 7,536,432 B2 | 5/2009 | Yamamoto | |
| 2003/0056001 A1* | 3/2003 | Mate | H04L 49/9073 709/238 |
| 2005/0144167 A1 | 6/2005 | Yamamoto | |
| 2008/0083036 A1* | 4/2008 | Ozzie | H04L 63/0428 726/27 |
| 2010/0031003 A1* | 2/2010 | Chen | G06F 9/30021 712/30 |
| 2012/0143873 A1* | 6/2012 | Saadat | G06F 17/30584 707/741 |

OTHER PUBLICATIONS

Castelli, V., "CSVD: clustering and singular value decomposition for approximate similarity search in high-dimensional spaces" vol. 15, Issue: 3, May 30, 2000, pp. 1-42.

"Quicksort" (Acessed on Aug. 18, 2011) http://en.wikipedia.org/wiki/Quicksort.

International Search Report dated Oct. 22, 2012 received in application No. PCT/US2012/051922.

Written Opinion of the International Searching Authority dated Oct. 22, 2012 received in application No. PCT/US2012/051922.

* cited by examiner

| Data Set A: | 300 | 290 | 262 | 255 | 190 | 100 |
|---|---|---|---|---|---|---|
| Index Value i: | 0 | 1 | 2 | 3 | 4 | 5 |

| Data Set B: | 280 | 260 | 250 | 220 | 170 | 150 |
|---|---|---|---|---|---|---|
| Index Value j: | 0 | 1 | 2 | 3 | 4 | 5 |

| Data Set C: | 270 | 265 | 245 | 230 | 200 | 165 |
|---|---|---|---|---|---|---|
| Index Value k: | 0 | 1 | 2 | 3 | 4 | 5 |

*Fig. 4A*

First Portions

| Data Set A: | 300 | 290 | 262 |
|---|---|---|---|
| Index Value i: | 0 | 1 | 2 |

| Data Set B: | 280 |
|---|---|
| Index Value j: | 0 |

| Data Set C: | 270 | 265 |
|---|---|---|
| Index Value k: | 0 | 1 |

Second Portions

| Data Set A: | 255 | 190 | 100 |
|---|---|---|---|
| Index Value i: | 3 | 4 | 5 |

| Data Set B: | 260 | 250 | 220 | 170 | 150 |
|---|---|---|---|---|---|
| Index Value j: | 1 | 2 | 3 | 4 | 5 |

| Data Set C: | 245 | 230 | 200 | 165 |
|---|---|---|---|---|
| Index Value k: | 2 | 3 | 4 | 5 |

| Data Set A: | 200 | 190 | 180 | 170 | 160 | 153 |
|---|---|---|---|---|---|---|
| Index Value i: | 0 | 1 | 2 | 3 | 4 | 5 |

| Data Set B: | 175 | 173 | 172 | 171 | 140 | 130 |
|---|---|---|---|---|---|---|
| Index Value j: | 0 | 1 | 2 | 3 | 4 | 5 |

| Data Set C: | 155 | 145 | 135 | 125 | 115 | 105 |
|---|---|---|---|---|---|---|
| Index Value k: | 0 | 1 | 2 | 3 | 4 | 5 |

Fig. 5B

*First Portions*

| Data Set A: | 200 | 190 | 180 | 170 | 160 |
|---|---|---|---|---|---|
| Index Value i: | 0 | 1 | 2 | 3 | 4 |

| Data Set B: | 175 | 173 | 172 | 171 |
|---|---|---|---|---|
| Index Value j: | 0 | 1 | 2 | 3 |

| Data Set C: | | | | | | |
|---|---|---|---|---|---|---|
| Index Value k: | | | | | | |

*Second Portions*

| Data Set A: | | | | | | 153 |
|---|---|---|---|---|---|---|
| Index Value i: | | | | | | 5 |

| Data Set B: | | | | | 140 | 130 |
|---|---|---|---|---|---|---|
| Index Value j: | | | | | 4 | 5 |

| Data Set C: | 155 | 145 | 135 | 125 | 115 | 105 |
|---|---|---|---|---|---|---|
| Index Value k: | 0 | 1 | 2 | 3 | 4 | 5 | ent application is a continuation under 35 U.S.C.
PARTITIONING SORTED DATA SETS

CROSS-REFERENCE TO RELATED APPLICATIONS

The present application is a continuation under 35 U.S.C. §120 of U.S. patent application Ser. No. 13/703,657, filed on Dec. 12, 2012, now U.S. Pat. No. 9,092,469, which is a U.S. national stage filing under 35 U.S.C. §371 of PCT Application No. PCT/US2012/051922, filed on Aug. 22, 2012.

BACKGROUND

Unless otherwise indicated herein, the materials described herein are not prior art to the claims in the present application and are not admitted to be prior art by inclusion in this section.

Information processing may include an operation of combining input (I) and memory information (S), giving processing (F) defined for an application, and acquiring output information (O). Thus, information processing may be expressed as a relation of O=F(I, S). To perform the processing, the input I and the memory information S may have a data type corresponding to the processing F. For example, if a data type is defined at a level of a Machine Instruction, a level of a compiler, and/or a level of an application, corresponding processing F may be defined for these data types.

One basic data type is an integer type. Basic operations, such as addition, subtraction, multiplication, division, and comparison may be performed at a level of machine instructions. Other operations may be performed on an integer type using a compiler and/or an application.

Another data type may be a variable-length data type, such as a character string. Various operations, such as move, copy, coupling of two or more character strings, division of a character string, searching a character string, insertion and/or deletion of the character string from a specified position may be implemented.

Another data type may be an aligned data sequence. Various operations, including but not limited to, a data sequence copy, a data sequence length calculation, a data sequence merge of two or more data sequences, a data sequence division, and a data sequence-element search may be implemented on a data sequence.

The data sequence copy operation may produce another data sequence. The data sequence length calculation operation may produce an indication of a length of a data sequence.

The data sequence division operation may divide one or more data sequences into two or more partial data sequences. The order key values within the data sequences may not be disrupted during a data sequence divide. A data sequence divide operation of a single data sequence and of 2 pair type aligned data sequences may be accomplished.

The data sequence merge operation of two or more data sequences may combine the two or more data sequences into a single data sequence. The data sequence-element search operation may determine a location of an element within a data sequence. For a 2pair type aligned data sequence, the data sequence merge operation and the data sequence element search operations may be performed using, in part, a data sequence division operation.

In order to decrease processing time to perform some of the above operations, parallel processing of the operations may be performed. Parallel processing may be performed using multiple individual processors, a processor with multiple cores, or some combination thereof.

SUMMARY

Techniques described herein may generally relate to partitioning of data into sorted data sets.

In some examples, a method for a computing device is described that may include locating a first partition index for each of three sorted data sets where each sorted data set may include multiple indexed data values. Each of the first partition indexes may identify an index location that may be utilized to partition the corresponding data set into first and second portions of data values. Each data value in each of the first portions of the data sets may have a greater magnitude than each data value in each of the second portions of the data sets. Locating the partition index for each of the data sets may include selecting an initial partition index for each data set and comparing the data values at the initial partition index for each data set to identify a highest data value and a lowest data value. Locating the partition index may also include adjusting the initial partition index for the data sets with the highest and lowest data values and comparing data values at the adjusted partition indexes of the two data sets and the data value at the initial partition index of the data set without an adjusted partition index.

In some examples, a method is described that may include partitioning, by a computing device, three sorted data sets that each include multiple indexed data values into first and second portions. Each data value in each of the first portions of the sorted data sets may have a greater magnitude than each data value in each of the second portions of the sorted data sets. The method may also include processing the first portions of the sorted data sets. The method may also include processing the second portions of the sorted data sets.

In some examples, a system is described that may include a first processor configured to process a first portion of each of three sorted data sets and a second processor configured to process a second portion of each of the three sorted data sets. The three sorted data sets may each include multiple indexed data values. The three sorted data sets may be partitioned into the first and second portions so that each data value in each of the first portions of the sorted data sets may have a greater magnitude than each data value in any of the second portions of the sorted data sets. The first and second processor may be either two separate processors, or two processor cores within the same processor.

In some examples, a computer-readable storage medium is described whose contents, when executed by a processor, may cause the processor to locate a first partition index for each of three sorted data sets. Each data set may include multiple indexed data values. Each first partition index may identify an index location that may be utilized to partition each corresponding sorted data set into a first portion of data values and a second portion of data values. Each data value in each of the first portions of the sorted data sets may have a greater magnitude than each data value in each of the second portions of the sorted data sets. Execution of the contents may also cause the processor to select an initial partition index for each sorted data set. Execution of the contents may also cause the processor to compare the data values at the initial partition index for each sorted data set to identify a highest data value and a lowest data value. Execution of the contents may also cause the processor to adjust the initial partition index for the sorted data set with the highest data value and for the sorted data set with the lowest data value. Execution of the contents may also cause the processor to compare data values at the adjusted partition indexes of the two data sets having the adjusted partition indexes and the data value at the initial partition index of the sorted data set without an adjusted partition index.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

In the drawings:

FIG. 4A illustrates three example data sets;

FIG. 4B illustrates an example partitioning of the data sets illustrated in FIG. 4A FIG. 5A illustrates three example data sets;

FIG. 5B illustrates an example partitioning of the data sets illustrated in FIG. 5A;

DETAILED DESCRIPTION

Figure 1A:
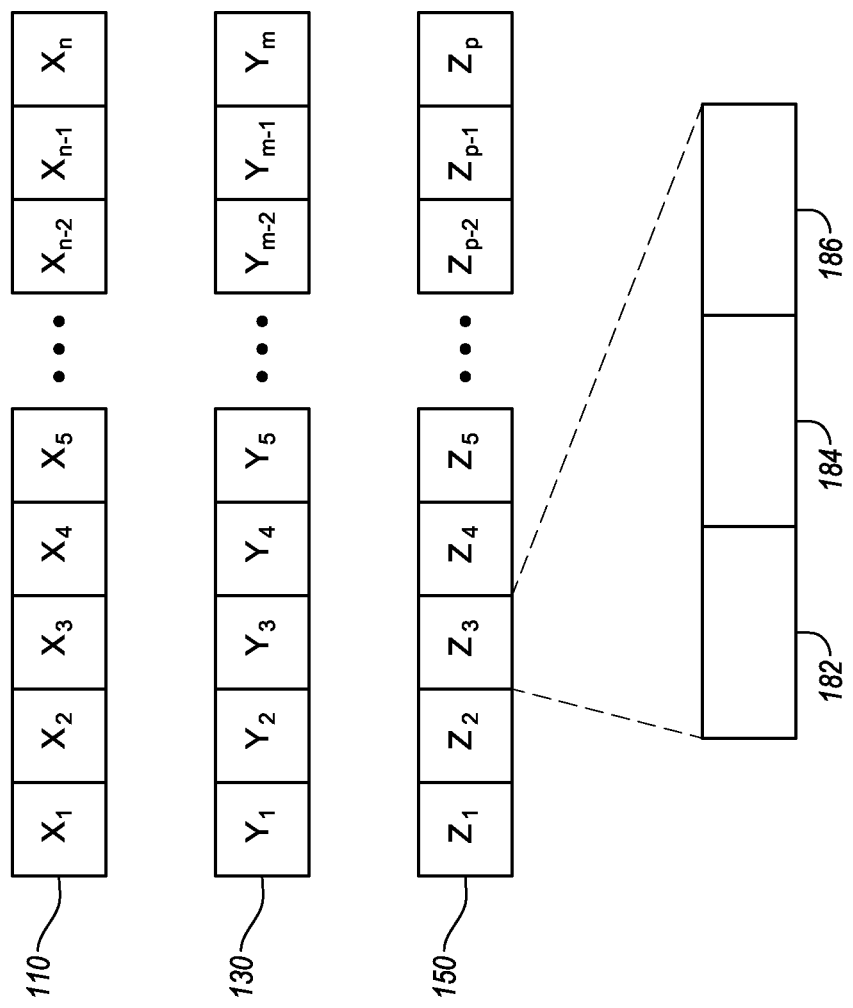
FIG. 1A illustrates three example data sets.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Some embodiments described herein may generally relate to information processing of aligned data sets, such as a merge operation, a division operation, a data element searching operation, among other operations that may be performed on aligned data sets. In particular, some embodiments describe a method of partitioning 3-pair type aligned data sets into an arbitrary number of partial data sets, without breaking the order of alignment of data keys used to sort the data sets. Partitioning data sets into partial data sets may allow for greater ease in information processing of the data sets. For example, partitioning 3-pair type aligned data sets may allow for a merger of the 3-pair type aligned data sets. Additionally, the method of partitioning the 3-pair type aligned data sets as described herein may be performed using parallel processing thereby decreasing an amount of time from start to finish to perform the division.

A general method to perform the division of 3-pair type aligned data sets may be as follows. Three sorted data sets may each be partitioned into first and second portions, where each value in each of the first portions of each data set may have a greater magnitude than each value in each of the second portions of each data set. Partitioning the three data sets into the first and second portions may allow parallel processing of the first and second portions of the three data sets. For example, the first portions of each of the three data sets may be merged and sorted by a first processor and the second portions of each of the three data sets may be merged and sorted by a second processor. The merged and sorted first and second portions may also be merged together. The merged and sorted first and second portions may be equivalent to the result of merging and then sorting the three data sets. Furthermore, in some embodiments, the three data sets may be independently partitioned into more than two portions. Each of the portions may be processed individually and in parallel and the results combined.

FIG. 1A illustrates three example data sets, arranged in accordance with at least some embodiments described herein. The three example data sets are described generally herein as data sets that may be partitioned based on the disclosure contained herein to generate partial data sets of an arbitrary number without disrupting the order of alignment of data keys within data elements that form the three example data sets.

The illustrated embodiment may include an x data set 110, a y data set 130, and a z data set 150. The x data set 110 may include n number of indexed data elements $X_1, X_2 \ldots X_n$. The y data set 130 may include m number of indexed data elements $Y_1, Y_2 \ldots Y_m$. The z data set 150 may include p number of indexed data elements $Z_1, Z_2 \ldots Z_p$. Each data element in each of the data sets 110, 130, 150 may include one or more data values. For example, FIG. 1A illustrates that the data element $Z_3$ may include first, second, and third data values 182, 184, 186. Each of the data values 182, 184, 186 may be a different type of data. For example, in some embodiments, data value 182 may be an identification number, data value 184 may be a name, and data value 186 may be an age.

Any type of data or combination of data may be included in the data elements of the data sets 110, 130, 150. Each data element of each data set 110, 130, 150 may contain at least one type of data value that is sortable. That is, each data element of each data set 110, 130, 150 may contain at least one type of data value that may be organized in a logical order, such as, ascending or descending order. For example, the sortable data values may be numbers or words that may be sorted in a logical order such as ascending or descending numerical order, ascending or descending alphabetical order, or the like.

The data elements of each of the data sets 110, 130, 150 may be sorted by at least one of the sortable data values within the data element. The data value that is used to sort the data elements within a data set may be referred to herein as a data key. The data elements of each of the data sets 110, 130, 150 may each contain the same type of data key by which the data sets 110, 130, 150 may be sorted. In some embodiments, the data sets 110, 130, 150 may contain multiple data values that may be data keys. In these and other embodiments, the data sets 110, 130, 150 may be aligned using one of the multiple data keys in either ascending or descending order.

As an example, the data sets 110, 130, 150 may be any sorted data sets that contain information about customers and individuals used by credit card companies, banking companies, e-commerce management companies, utility companies, such as cell phone companies, power companies, gas companies, and water supply companies, as well as other companies. In these and other examples, a data element within the data sets 110, 130, 150 may be a group or collection of data values that represent information about an individual that is a customer, potential customer, or someone of interest to the company that maintains the sorted data sets 110, 130, 150. As one example, the data values within the data element may include an identification number assigned to an individual, the name of the individual, and the credit score of the individual.

As another example, the data sets 110, 130, 150 may be any sorted data sets that contain information used in databases for managing inventory of merchandise and other products. In these and other examples, a data element within the data sets 110, 130, 150 may be a group or collection of data values that represent information about a particular type of product of a company that maintains the sorted data sets 110, 130, 150. As one example, the data values within the data element may include a product identification number, such as a UPC bar code number, the total number of products in inventory, the locations where the product is located, and other information about the product. The foregoing examples of data sets are given only as examples and are not limiting in any way.

In some embodiments, the number of data elements n, m, and p within each data set 110, 130, 150, respectively may be the same. In other embodiments, the number of data elements n, m, and p within each data set 110, 130, 150, respectively, may be different. In some embodiments, the data elements in the data sets 110, 130, 150, may include one, two, three, four, or more data values. In some embodiments, the data elements in one of the data sets 110, 130, 150 may contain more data values than the data elements in another of the data sets 110, 130, 150. Alternately or additionally, the data elements within each data set 110, 130, 150 may contain the same number of data values. Furthermore, the data elements within the data sets 110, 130, 150 may be indexed. For example, the first data element of the data set 110 may have an index value of 0 and the last data element of the data set 110 may have an index value of n−1, with the remaining data elements having corresponding index values between 0 and n−1.

The data sets 110, 130, 150 may be used in or subjected to various processing operations. For example, the data sets 110, 130, 150 may be merged or have some other processing operation performed thereon that generates one or more new data sets. Alternately or additionally, processing operations such as element retrieval and other non-altering processing operations may be performed on the data sets 110, 130, 150.

The present disclosure provides for partitioning the data sets 110, 130, 150 and/or any 3-pair type aligned data sets into the 3-pair type aligned partial data sets of an arbitrary number without disrupting the order of alignment of data keys of the data sets. Partitioning the data sets 110, 130, 150 may assist in the merging, element retrieval or other operation(s) performed on the data sets 110, 130, 150.

The data sets 110, 130, 150 may be partitioned into two or more portions. In particular, the data sets 110, 130, 150 may be partitioned into two or more portions where the data keys used to sort the data elements in a first portion of the data sets 110, 130, 150 are greater in magnitude than the data keys used to sort data elements in a second portion of the data sets 110, 130, 150. For example, the range of sorted data keys in a first portion may be from 100 to 50 and the range of sorted data keys in a second portion may be from 48 to 5.

Partitioning of the data sets 110, 130, 150 may not be limited to sorted data keys with numerical values (e.g., floating point values or integer values). For example, the data sets 110, 130, 150 may be sorted by data keys that contain words or characters. In the logical order assigned to the sorted data keys, a first portion of the data sets 110, 130, 150 may contain data keys of greater magnitude than data keys in the second portion of the data sets 110, 130, 150. For example, the first portion may contain sorted data keys, such as words, that start with the letters A to M and the second portion may contain data keys that start with the letters N to Z. Thus, the partitioning of the data sets 110, 130, 150 may maintain the logical order of the sorted data keys so that no data key in a first portion would logically fall between data keys in a second portion.

Figure 1B:
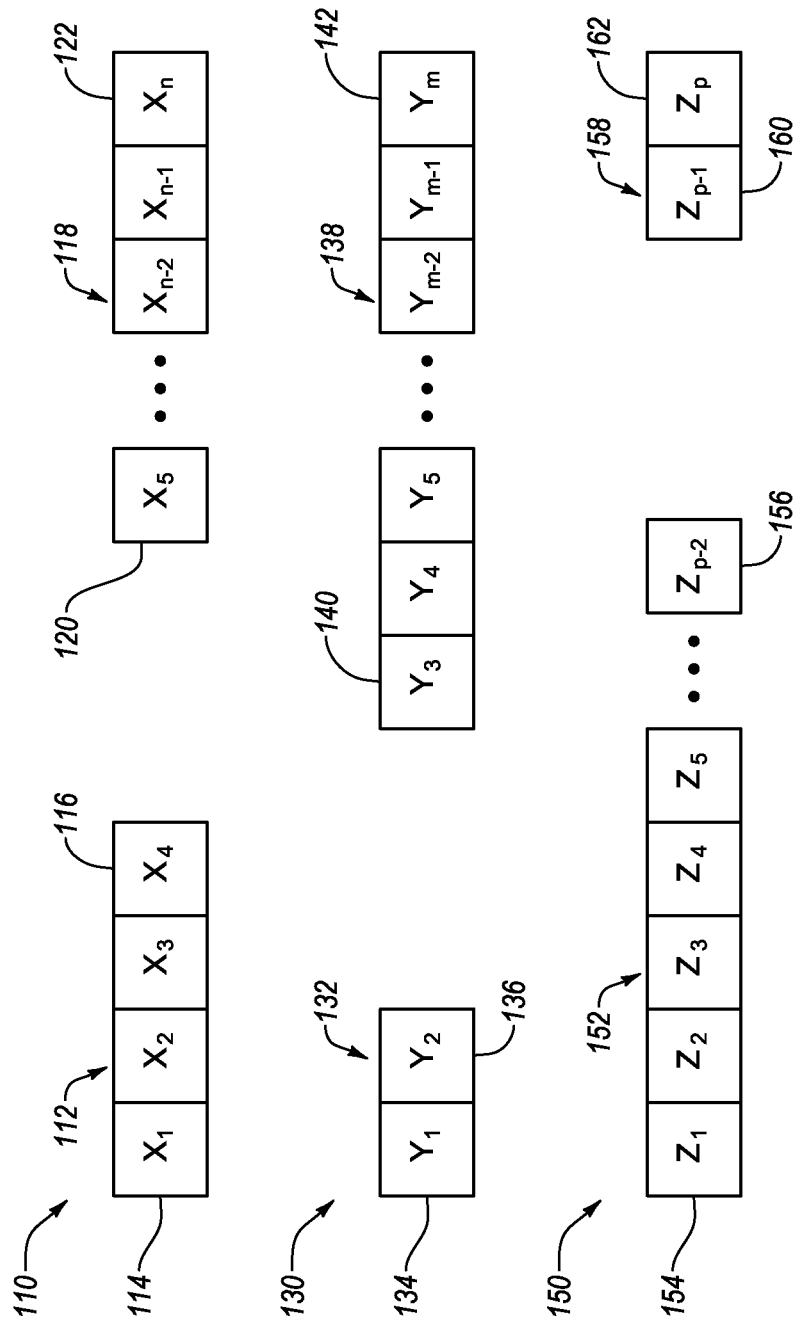
FIG. 1B illustrates an example partitioning of the data sets illustrated in FIG. 1A.

FIG. 1B illustrates an example partitioning of the data sets 110, 130, 150 illustrated in FIG. 1A, arranged in accordance with at least some embodiments described herein. The x data set 110 may be partitioned into first and second portions 112, 118. The first portion 112 may have a head data element 114 and a tail data element 116. In general, a head data element may be a first data element in a portion of a data set and a tail data element may be a last data element in a portion of a data set. Thus, the second portion 118 may also have a head data element 120 and a tail data element 122. The tail data element 116 of the first portion 112 may be the data element that was adjacent to the head data element 120 of the second portion 118 before the x data set 110 was partitioned.

The y data set 130 may be partitioned into first and second portions 132, 138. The first portion 132 may have a head data element 134 and a tail data element 136. The second portion 138 may have a head data element 140 and a tail data element 142. The tail data element 136 of the first portion 132 may be the data element that was adjacent to the head data element 140 of the second portion 138 before the y data set 130 was partitioned.

The z data set 150 may be partitioned into first and second portions 152, 158. The first portion 152 may have a head data element 154 and a tail data element 156. The second portion 158 may have a head data element 160 and a tail data element 162. The tail data element 156 of the first portion 152 may be the data element that was adjacent to the head data element 160 of the second portion 158 before the z data set 150 was partitioned.

The division of the data sets 110, 130, 150 may satisfy two conditions. The first condition may be the first portions 112, 132, 152 and the second portions 118, 138, 158 having tail and head data elements respectively, with the minimum value of the data keys in the tail data elements in the first portions 112, 132, 152 being larger or equal to the maximum value of the data keys in the head data elements in the second portions 118, 138, 158 as illustrated in the following equation:

$$\min[\text{tail data element 116, tail data element 136, tail data element 156}] >= \max[\text{head data element 120, head data element 140, head data element 160}].$$

The second condition may be that the number of data elements in the first portions 112, 132, 152 is equal to 3X where X is a value obtained by dividing the total number of data elements in the first portions 112, 132, 152 by 3.

The first portions 112, 132, 152 having data keys in the tail data elements that are larger in magnitude than the data keys in the head data elements in the second portions 118, 138, 158 may be referred to as maintaining the magnitude of the data keys of the first and second portions 112, 118, 132, 138, 152, 158. Other data values in the data elements that were not used to sort the data sets 110, 130, 150 may vary in magnitude between the values of first portions 112, 132, 152 and the second portions 118, 138, 158.

By maintaining the magnitudes of the first and second portions 112, 118, 132, 138, 152, 158, the first and second portions 112, 118, 132, 138, 152, 158 may be processed independently and/or in parallel. In a particular example, the first and second portions may be sorted in parallel (e.g., the processing time intervals of the portions may occur in substantially overlapping time intervals) and then merged to form a sorted data set that includes the data keys in the three data sets 110, 130, 150. By maintaining the magnitude of the first and second portions 112, 118, 132, 138, 152, 158 no additional sorting of the merged first and second portions may be necessary.

Figure 2A:
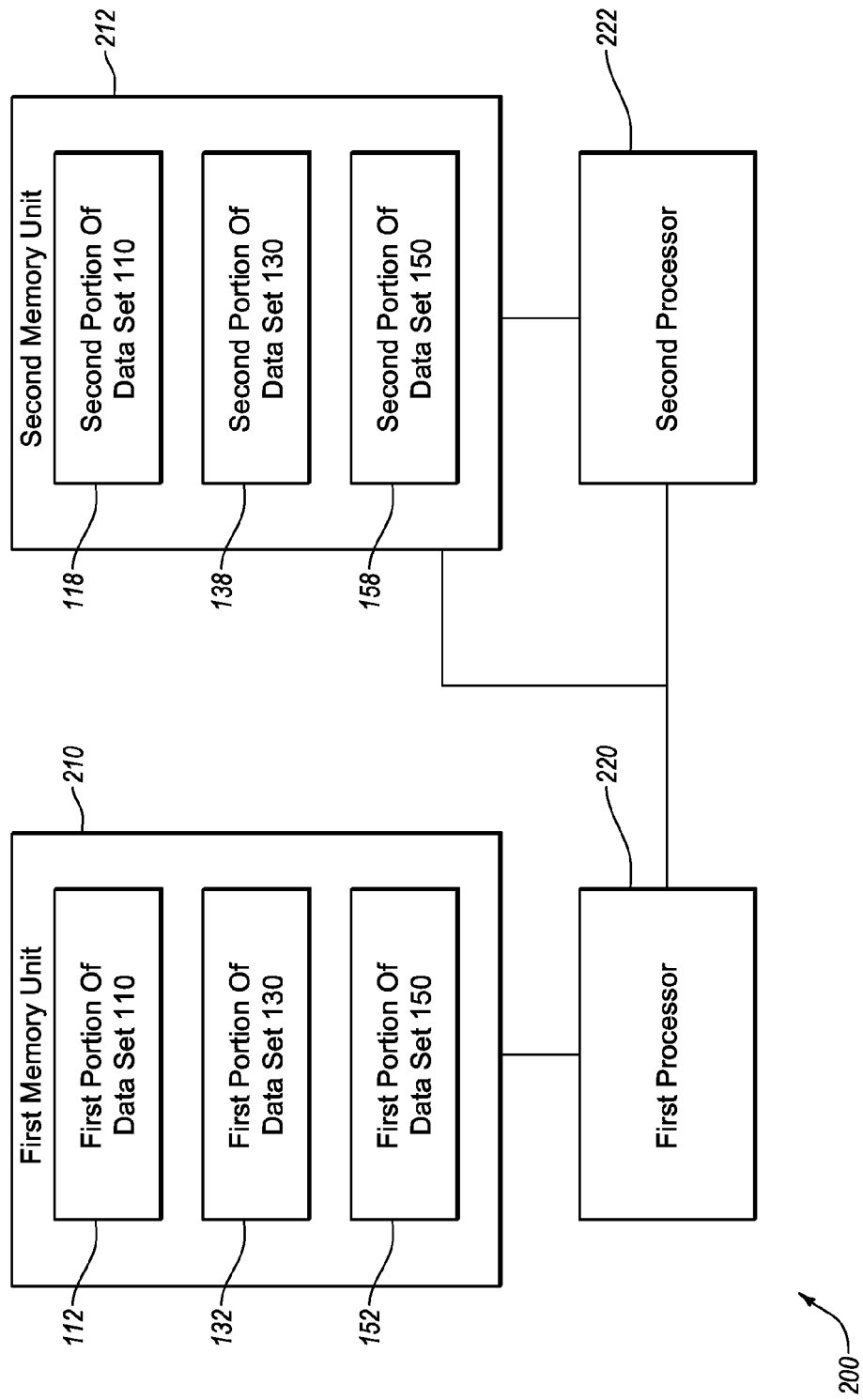
FIG. 2A illustrates an example system configured to process the partitioned portions of the data sets of FIG. 1B.

FIG. 2A illustrates an example system 200 configured to process the partitioned portions 112, 132, 152, 118, 138, 158 of the data sets 110, 130, 150 of FIG. 1B, arranged in accordance with at least some embodiments described herein. The system 200 may include first and second memory units 210, 212. The first and second memory units 210, 212 may be coupled to a first processor 220. The second memory unit 212 may also be coupled to a second processor 222.

FIG. 2A illustrates the first portions 112, 132, 152 of the data sets 110, 130, 150 stored in the first memory unit 210 and the second portions 118, 138, 158 of the data sets 110, 130, 150 stored in the second memory unit 212. In some embodiments, the first and second memory units 210, 212 may be separate and physically distinct memory units. In other embodiments, the first and second memory units 210, 212 may be separate logical partitions within the same memory unit.

In some embodiments, the first processor 220 may be configured to evaluate the data sets 110, 130, 150 to determine if the data sets 110, 130, 150 may be partitioned. For example, the first processor 220 may determine if the data sets 110, 130, 150 are sorted and that the data sets 110, 130, 150 each contain data elements with at least one data key that may be compared.

After evaluating the data sets 110, 130, 150, the first processor 220 may be configured to identify partition indexes to partition the data sets 110, 130, 150 to form first portions 112, 132, 152 and second portions 118, 138, 158. The first processor 220 may also be configured to load the first portions 112, 132, 152 and the second portions 118, 138, 158 into the first and second memory units 210, 212, respectively. The first processor 220 may also be configured to process the first portions 112, 132, 152 of the data sets 110, 130, 150. The second processor 222 may be configured to process the second portions 118, 138, 158 of the data sets 110, 130, 150 upon receiving instructions from the first processor 220. In some embodiments, the first portions 112, 132, 152 may be processed by the first processor 220 independently of the second portions 118, 138, 158, which may be processed by the second processor 222. In some embodiments, the first portions 112, 132, 152 may be processed in substantially overlapping time intervals with the second portions 118, 138, 158. In some embodiments, the first and second processors 220, 222 may be physically separate processors. In other embodiments, the first and second processors 220, 222 may each be a different core in a multi-core processor.

In some embodiments, the first and second processors 220, 222 may respectively be configured to merge and/or sort the first portions 112, 132, 152 and the second portions 118, 138, 158. Any known sorting algorithm may be used. For example, the sorting algorithm may be a selection sort, insertion sort, comb sort, merge sort, heap sort, quick sort, counting sort, radix sort, or other type of sorting algorithm. In some embodiments, after sorting the second portions 118, 138, 158 the second processor 222 may merge the second portions 118, 138, 158 and indicate to the first processor 220 that the second portions 118, 138, 158 are sorted and merged. After receiving an indication that the second portions 118, 138, 158 are sorted and after sorting and merging the first portions 112, 132, 152, the first processor 220 may combine the sorted and merged first portions 112, 132, 152 and second portions 118, 138, 158. The first processor 220 may merge the sorted and merged first portions 112, 132, 152 and second portions 118, 138, 158 in either the first or second memory units 210, 212 or in another memory unit.

By partitioning the data sets 110, 130, 150 into the first portions 112, 132, 152 and the second portions 118, 138, 158; merging and sorting the first portions 112, 132, 152 and the second portions 118, 138, 158 in substantially overlapping time intervals; and then merging the merged and sorted first portions 112, 132, 152 and second portions 118, 138, 158; the data sets 110, 130, 150 may be combined to form a sorted data set faster than might otherwise be possible. In particular, when the data sets 110, 130, 150 are large data sets, such as data sets that contain a number of data keys larger than about 50,000; 100,000; 500,000; 1,000,000; 20,000,000; or about 50,000,000; the reduced time to merge and sort the data sets 110, 130, 150 may be significant compared to merging and sorting the data sets 110, 130, 150 using a single processor or a single processor core.

Figure 2B:
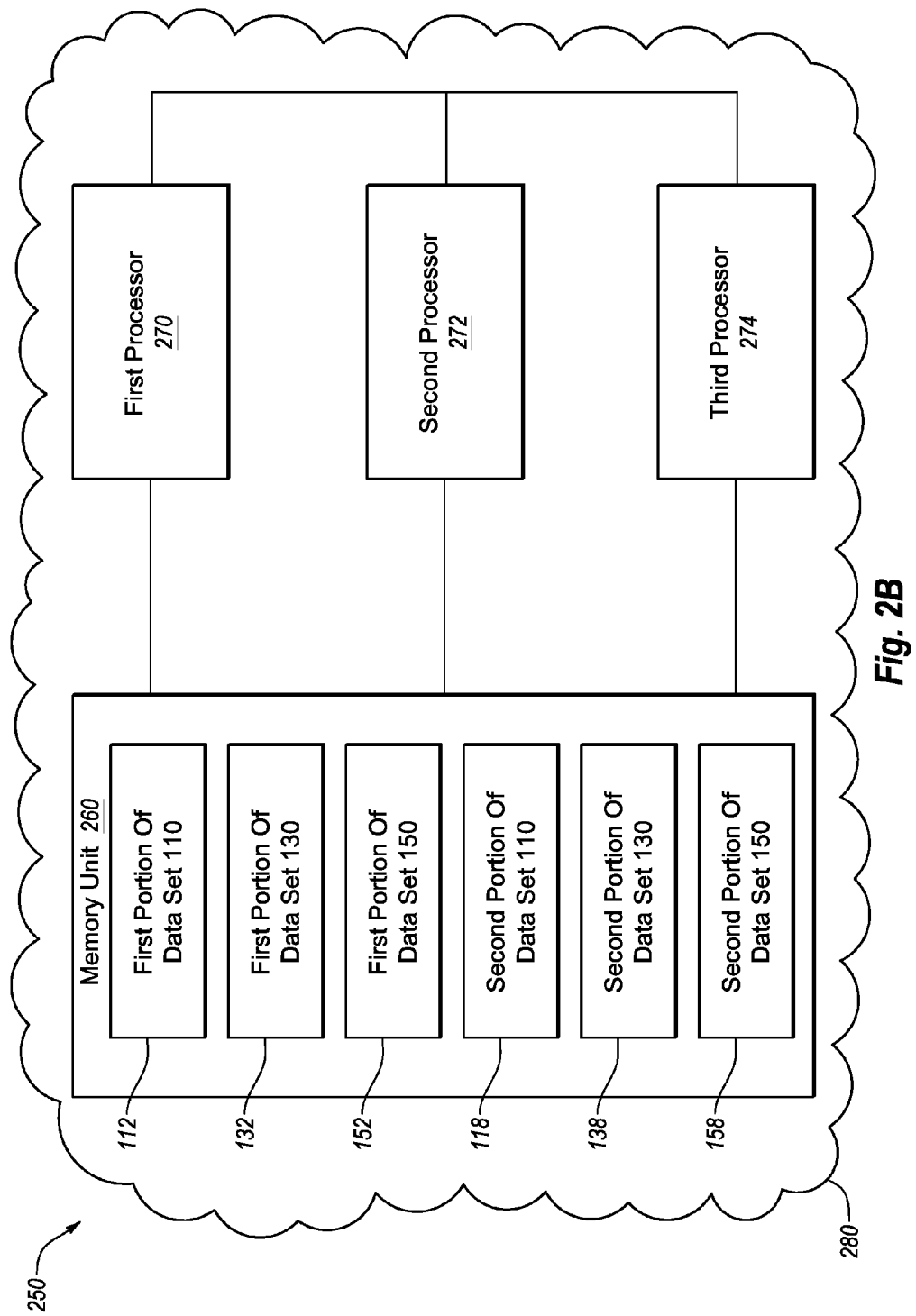
FIG. 2B illustrates another example system configured to process the partitioned portions of the data sets of FIG. 1B.

FIG. 2B illustrates another example system 250 configured to process the partitioned portions 112, 132, 152, 118, 138, 158 of the data sets 110, 130, 150 of FIG. 1B, arranged in accordance with at least some embodiments described herein. The system 250 includes a memory unit 260 that stores the first portions 112, 132, 152 and the second portions 118, 138, 158. The system 250 further includes first, second, and third processors 270, 272, 274 networked together and to the memory unit 260. The memory unit 260 and the processors 270, 272, 274 may be part of a computing cloud 280.

In some embodiments, the third processor 274 may upload the first portions 112, 132, 152 and the second portions 118, 138, 158 into the memory unit 260 after they are sent to the computing cloud 280. In some embodiments, the third processor 274 may upload the data sets 110, 130, 150 into the memory unit 260 and partition the data sets 110, 130, 150 to form the first portions 112, 132, 152 and the second portions 118, 138, 158. In some embodiments, each processor 270, 272, 274 may have a separate memory unit. In these and other embodiments, the third processor 274 may upload the data sets 110, 130, 150 into each separate memory unit for partitioning by each memory unit's corresponding processor 270, 272, 274.

In some embodiments, the third processor 274 may instruct the first processor 270 to process the first portions 112, 132, 152. The third processor 274 may also instruct the second processor 272 to process the second portions 118, 138, 158. The first and second processors 270, 272 may process the first portions 112, 132, 152 and the second portions 118, 138, 158 respectively. In some embodiments, either of the first or second processors 270, 272 may perform the functions of the third processor 274 and the third processor 274 may be omitted from the system 250.

FIG. 1A illustrates an example of 3-pair aligned data sets and provides various properties of the 3-pair aligned data sets. Generally, an aligned data set (ADS: Aligned Data Set) may be expressed based on the following notation ADS (name) =ADS(DDS:N). The left part of the notation defines a data set name and the right-hand side defines the composition of the data set. DDS is the abbreviation of Definition of Data Set, and defines the data elements within the data set in arbitrary form. N specifies the number of data elements in the data set. 3 pair aligned data sets may be described as follows:

ADS3(name)=ADS3 {ADS(DDS:$N$), ADS(DDS:$N$), ADS(DDS:$N$)}

The data sets may have the same number of data elements or a different number of data elements. The data elements within the 3-pair aligned data sets may each have a data key. The 3-pair aligned data sets may be organized in a logical order based on the data keys within the data elements of the 3-pair aligned data sets.

As noted before, the position of a data element within one of the data sets of the 3-pair aligned data sets may be specified using an index. In some embodiments, the index may commence at zero at the left hand side of the data set and increment by 1. In some embodiments, the index may commence at another number, such as 1, at either the left or right hand side, and may increment by 1 or some other value, such as, 2, 3, 4, 5, or some other value. Thus, the value of the index may indicate a data element within a data set. The data element may contain various data values and a data key.

In order to maintain a magnitude of data keys in the 3-pair aligned data sets when partitioning the 3-pair aligned data sets, locations to partition the 3-pair aligned data sets, referred to herein as partition indexes, may not be arbitrarily chosen. A method to partition the 3-pair aligned data sets may be derived based on a definition of the partition of the 3-pair aligned data sets. The method may commence by selecting an initial partition index and by comparing key values of the data elements at the initial partition index and indexes surrounding the initial partition index.

As an example, a first data set ADS (A:N), a second data set ADS (B:N), and a third data set ADS (C:N) may form 3-pair aligned data sets referred to as ADS3 {ADS (A:N), ADS (B:N), ADS (C:N)}, where A, B, and C respectively is an identifier of each of the respective data sets and N is the number of data elements in each of the data sets. A proper partition of the 3-pair aligned data sets may result in 3 first portion aligned data sets (ADS3 (First Portion)) and 3 second portion aligned data sets (ADS3 (Second Portion)). When the 3-pair aligned data sets are properly partitioned:

min[$K$\{ADS($A(na1-1)$)\}, $K$\{ADS($B(nb1-1)$)\}, $K$\{ADS($C(nc1-1)$)\}]≥max[$K$\{ADS($A(na1)$)\}, $K$\{ADS($B(nb1)$)\}, $K$\{ADS($C(nc1)$)\}] and $na1+nb1+nc1=3x$ where na1 is an arbitrary index value less than N−1 where the partition occurs in the A data set, nb1 is an arbitrary index value less than N−1 where the partition occurs in the B data set, and nc1 is an arbitrary index value less than N−1 where the partition occurs in the C data set with the indexing of the 3-pair aligned data sets commencing at zero. The variable 3x may be the number of data elements in the 3 first portions of the 3-pair aligned data sets where x is equal to (na1+nb1+nc1)/3.

Based on the above description of the partition, ADS3(First Portion)=ADS3 {ADS(A1:na1), ADS(B1:nb1), ADS(C1:nc1), 3x} where A1 is an identifier for a first portion of the A data set, B1 is an identifier for a first portion of the B data set and C1 is an identifier for a first portion of the C data set. Furthermore, ADS3(Second Portion)=ADS3 {ADS(A2:N−na1), ADS(B2:N−nb1), ADS(C2:N−nc1), 3N−3x} where A2 is an identifier for a second portion of the A data set, B2 is an identifier for a second portion of the B data set, and C2 is an identifier for a second portion of the C data set.

From the definitions, a first and a second formula may be derived as follows:

$(na1-x)+(nb1-x)+(nc2-x)=0$ and  First formula $\{(na1-1)-(x-1)\}+\{(nb1-1)-(x-1)\}+\{(nc2-1)-(x-1)\}=0$,  Second formula where n(value1)(value2) represents a number of data elements, the value1 indicates the data set and the value2 indicates the portion of the partitioned data set. For example, nb1 represents the number of data elements in the first portion of the data set B.

The first and second formulas indicate that a combined difference between partition index values of tail data elements of the first portions of the 3-pair aligned data sets and an initial partition index value and a combined difference between partition index values of head data elements of the second portions of the 3-pair aligned data sets and the initial partition index value may be the same. Furthermore, a first property may be derived from the first and second formulas that the partition index the farthest from the initial partition index is offset from the initial partition index in a different direction than the remaining two partition indexes. For example, if the initial partition index is 10, and the partition index the farthest from the initial partition index is 6, then the remaining two partition indexes have values greater than or equal to 10.

A second property may be that a relationship between magnitudes of the data key of tail data elements of the first portions is unknown and a relationship between magnitudes of the data keys of head data elements of the second portions is unknown. The second property may be based on the distribution of the data key within each of the 3-pair aligned data sets being independent of each other.

A third property may be that when comparing the data key of data elements at the initial partition indexes and indexes surrounding the initial partition index and adjusting the indexes of a data set to compare the data key at the adjusted indexes, a first data set of the 3-pair aligned data sets with the largest data key and a second data set of the 3-pair aligned data sets with the smallest data key during one comparison may reverse during a next subsequent comparison so that the first data set may have the smallest data key and the second data set may have the largest data key.

Figure 3A:
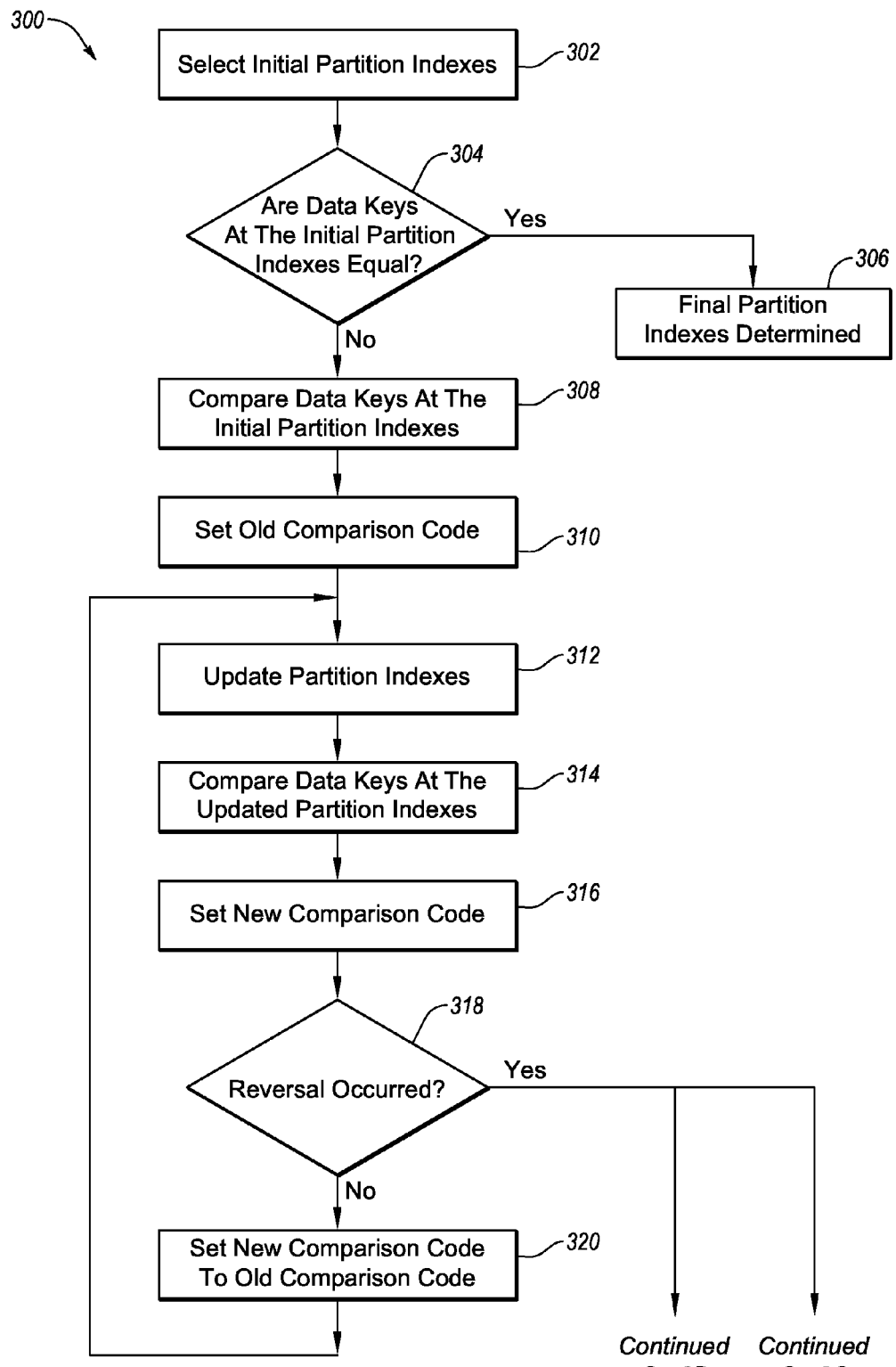
FIGS. 3A, 3B, and 3C show an example flow diagram of a method for determining a partition index for each of three sorted data sets.
Figure 3B:
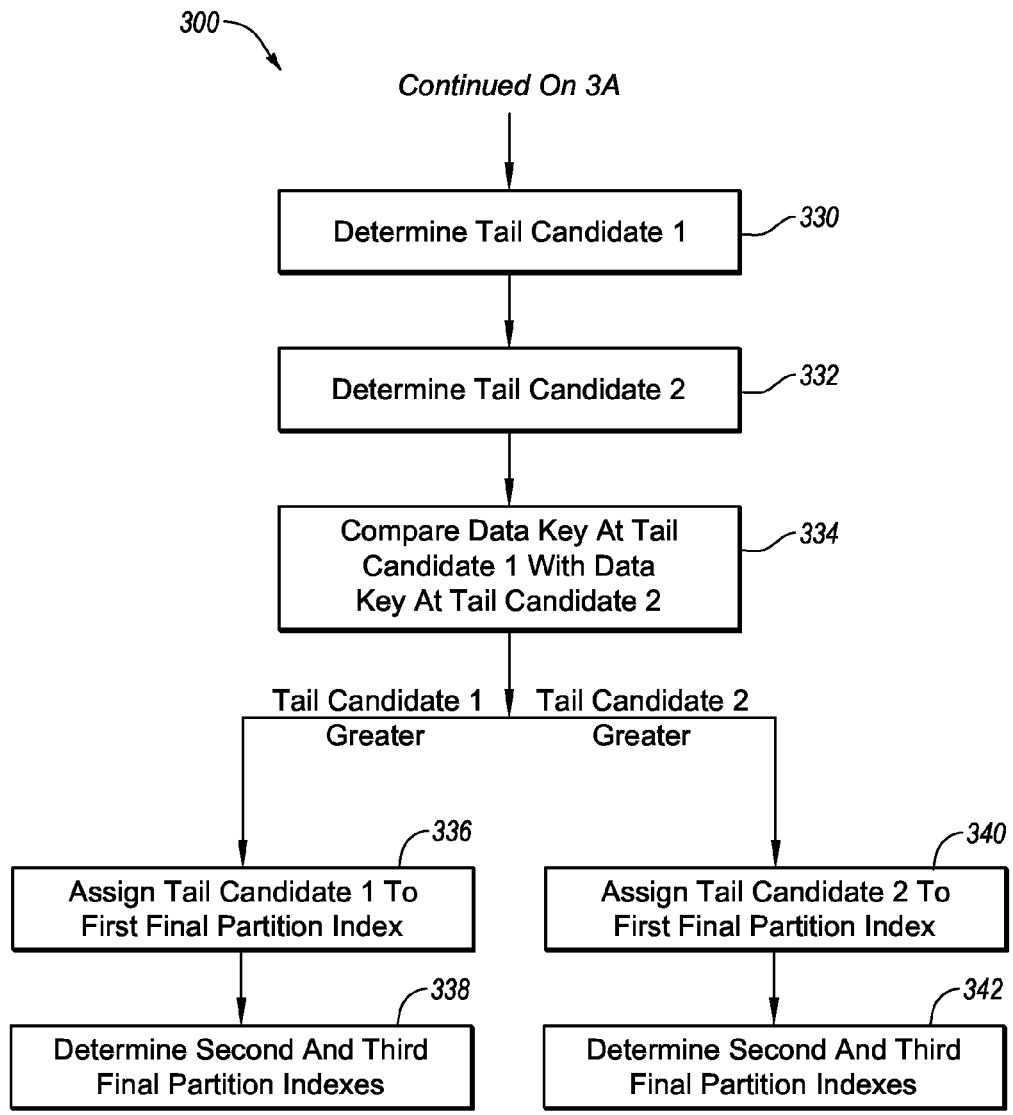
Figure 3C:
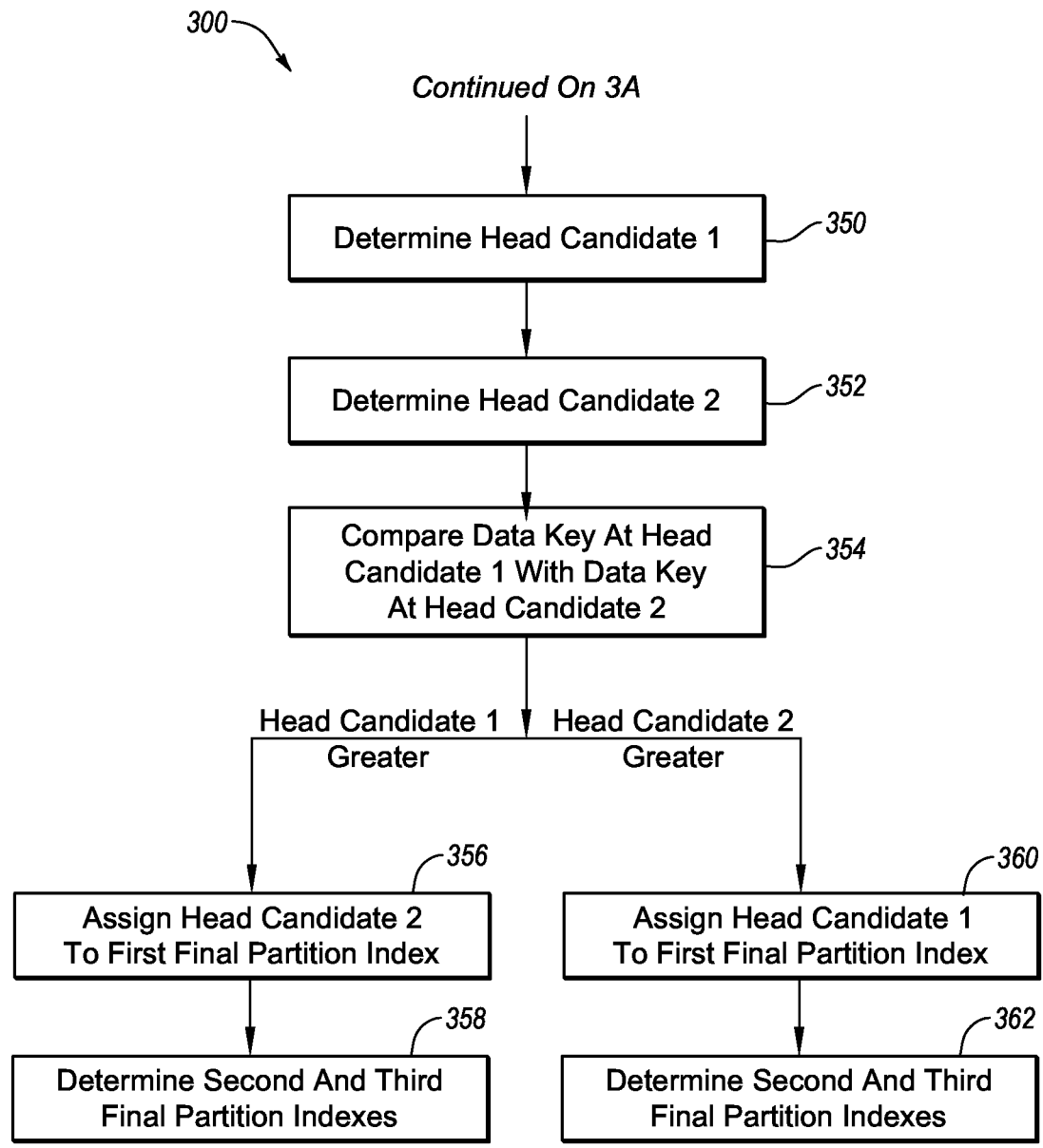

FIGS. 3A, 3B, and 3C show an example flow diagram of a method 300 of determining a partition index for each of three sorted data sets, arranged in accordance with at least some embodiments described herein. The method 300 may be performed in whole or in part on data sets, such as the data sets illustrated in FIG. 1A and discussed above. The method 300 may be used to determine partition indexes where the data sets may be partitioned. The method 300 may include various operations, functions, or actions as illustrated by one or more of blocks 302, 304, 306, 308, 310, 312, 314, 316, 318, 320, 330, 332, 334, 336, 338, 340, 342, 350, 352, 354, 356, 358, 360, and/or 362 in FIGS. 3A, 3B, and 3B. Referring now to FIG. 3A, the method 300 may begin at block 302.

In block 302, ["Select Initial Partition Indexes"], a computing device may be configured (e.g., via software or firmware) to select initial partition indexes for partitioning the data sets. The data sets may include data set A, data set B, and data set C. In some embodiments, the initial partition indexes may be the same for each data set. In some embodiments, the initial partition indexes may be different for each data set. In some embodiments, the initial partition indexes may be determined based on the number of data elements within each of the data sets. For example, the initial partition indexes may be equal to the modulus of the combined number of data elements in all three sets divided by 2, 3, 4, 5, 6 or some other number.

The location of the initial partition indexes may also vary based on the number of portions into which the data sets are partitioned and based on approximately how many data elements are desired in each portion of a data set. For example, in some embodiments, it may be desired to have the number of data elements in each portion be equal or substantially equal. In some embodiments, the number of data elements in the first portions based on the initial partition indexes may be a multiple of 3. In these and other embodiments, the initial partition index may be x−1 for each data set, where 3x equals the number of data elements in the first portions. In some embodiments, the number of data elements in the first portions based on the initial partition indexes may not be a multiple of three. In these and other embodiments, the number of data elements may be 3x+1 or 3x+2. In the case of 3x+1 number of data elements, the initial partition indexes are selected as x. The partition index of the data set with the largest data key at the initial partition index of x remains x. The other initial partition indexes for the other data sets may be x−1. In the case of 3x+2 number of data elements, the initial partition indexes are selected as x. The partition index of the data set with the smallest data key at the initial partition index of x remains x. The other initial partition indexes for the other data sets may be x−1. In some embodiments, the initial partition indexes may vary based on whether head data elements of the second portions of the data sets or tail data elements of the first portions of the data sets are being determined. For example, when determining the tail data elements, the initial partition indexes may be x−1 and when determining the head data elements the initial partition indexes may be x.

The initial partition indexes of the data sets may be represented by (i, j, k) with i being the partition index for data set A, j being the partition index for data set B, and k being the partition index for data set C. The key value of the data set A at the partition index i may be represented by A(i). The key value of the data set B at the partition index j may be represented by B(j). The key value of the data set C at the partition index k may be represented by C(k). Block 302 may be followed by block 304.

In block 304, ["Are Data Keys at the Initial Partition Indexes Equal?"], the computing device can be configured to compare the data keys at the partition indexes of i, j, k, which are equal to the initial partition indexes set in block 302, to determine if the data keys are all substantially equal. If the data keys are determined to be substantially equal to one another, then block 304 may be followed by block 306. If the data values are determined to not be substantially equal to one another, then block 304 may be followed by block 308.

In block 306, ["Final Partition Indexes Determined"], the computing device may be configured to determine that the final partition indexes for the data sets may equal the initial partition indexes used for the data sets. The method 300 may be complete.

In block 308, ["Compare Data Keys At The Initial Partition Indexes"], the computing device may be configured to determine the data set with the largest data key, the data set with the smallest data key, and the data set with the middle data key based on the initial partition indexes. Block 308 may be followed by block 310.

In block 310, ["Set Old Comparison Code"], the computing device may be configured to set an old comparison code (C_old) based on key values of the various data sets at the initial partition indexes. For example, when A(i)>B(j)>C(k) then C_old may equal 1. When A(i)>C(k)>B(j) then C_old may equal 2. When B(j)>A(i)>C(k) then C_old may equal 3. When B(j)>C(k)>A(i) then C_old may equal 4. When C(k)>A(i)>B(j) then C_old may equal 5. When C(k)>B(j)>A(i) then C_old may equal 6. The C_old may also contain the index values for the data set A, the data set B, and the data set C that are used to set the C_old.

In block 312, ["Update Partition Indexes"] the computing device may be configured to adjust (e.g., increment or decrement) the partition indexes for the data sets with the highest and lowest data keys at their respective partition indexes to generate updated partition indexes. For example, when A(i)>B(j)>C(k), then the partition index of the data set A and the data set C may be updated by adjusting the partition indexes i and k. In these and other embodiments, the partition index j of data set B may not be adjusted.

In some embodiments, the partition indexes may be adjusted by incrementing or decrementing (e.g., by one, two or some other increment value) to an adjacent or nearby index. The partition index of the data set with the highest data key may be adjusted to a partition index with a lower data key. Similarly, the partition index for the data set with the lowest data key may be adjusted to a partition index with a higher data key. When the partition index for the data set with the highest data key is incremented, the partition index for the data set with the lowest data key may be decremented. Alternately, when the partition index for the data set with the highest data key is decremented, the partition index for the data set with the lowest data key may be incremented.

In some embodiments, when the partition index is adjusted (e.g., incremented or decremented) the adjusted partition index may fall outside the number of data keys in a data set. If the current partition index of a data set is adjusted beyond the number of data keys in the data set, a random data value may be associated with the data set so that future comparisons of the value of the particular data set at the adjusted partition index may occur. Associating the random value with the particular data set does not insert the random value into the data set. Rather, the random value is merely associated with the data set for comparison purposes within the method 300. For example, when the data key at a partition index is the lowest data key just before adjusting the partition index beyond the number of data elements in the data set, the random data key associated with the data set may be lower than any data key in any of the data sets. Conversely, when the data key at a partition index is the largest data key in a data set just before adjusting the partition index beyond the number of data keys in the data set, the random data key associated with the data set may be larger than any data key in any of the data sets. Block 312 may be followed by block 314.

In block 314, ["Compare Data Keys At The Updated Partition Indexes"], the computing device may be configured to determine the data set with the largest data key, the data set with the smallest data key, and the data set with the middle data key based on the updated partition indexes of the data sets. Block 314 may be followed by block 316.

In block 316, ["Set New Comparison Code"], the computing device may be configured to set a new comparison code (C_new) based on key values of the various data sets at the updated partition indexes. For example, when A(i)>B(j)>C(k) then C_new may equal 1. When A(i)>C(k)>B(j) then C_new may equal 2. When B(j)>A(i)>C(k) then C_new may equal 3. When B(j)>C(k)>A(i) then C_new may equal 4. When C(k)>A(i)>B(j) then C_new may equal 5. When C(k)>B(j)>A(i) then C_new may equal 6. The C_new may also contain the partition index values for the data set A, the data set B, and the data set C that are used to set the C_new. Block 316 may be followed by block 318.

In block 318, ["Reversal Occurred?"], the computing device may be configured to determine if a reversal occurred based on the definition of the third property, namely that a first data set of the 3-pair aligned data sets with the largest key value and a second data set 3-pair aligned data sets with the smallest key value during one comparison are reversed so that the first data set has the smallest key value and the second data set has the largest key value during a next subsequent comparison. The reversal may be determined by comparing the C_old and the C_new. A reversal occurs when C_new equals 1 and C_old equals 6, when C_new equals 2 and C_old equals 4, when C_new equals 3 and C_old equals 5, when C_new equals 4 and C_old equals 2, when C_new equals 5 and C_old equals 3, when C_new equals 6 and C_old equals 1. As an example, when C_old equals 6, C(k)>B(j)>A(i) at a previous partition index. When C_new equals 1, A(i)>B(j)>C(k) at an updated partition index. A reversal occurs because C(k) is the greatest at the previous partition index and the least at the updated partition index and A(i) is the least at the previous partition index and the greatest at the updated partition index.

When a reversal occurs, the method 300 may be followed by block 330 (see FIG. 3B) for selection of final partition indexes for the tail data elements of the first portions of the data sets and/or by block 350 (see FIG. 3C) for selection of final partition indexes for the head data elements of the second portions of the data sets. When a reversal does not occur, the method 300 may be followed by block 320.

In block 320, ["Set New Comparison Code to Old Comparison Code"], the computing device may be configured to set the C_new to the C_old, such that the C_old contains the value of the C_new. For example, if C_new equals 4 and C_old equals 1, after setting C_new to C_old, C_new and C_old would both equal 4. Block 320 may be followed by block 312. Blocks 312, 314, 316, 318, and 320 may be repeated until a reversal occurs in block 318.

Referring now to FIG. 3B, in block 330, ["Determine Tail Candidate 1"], the computing device may be configured to determine a partition index of a data set for tail candidate 1. The tail candidate 1 may be the partition index of the data set with the highest data key of the partition indexes of the data sets with the lowest data keys from the C_old and the C_new that determined a reversal occurred in block 318. For example, when the C_old equals 6 based on C(k)>B(j)>A(i) at a previous partition index and the C_new equals 1 based on A(i)>B(j)>C(k) at an updated partition index, the A(i) at the previous partition index is compared to C(k) at the updated partition index to determine which is larger. The partition index with the larger data key is selected as the tail candidate 1. Block 330 may be followed by block 332.

In block 332, ["Determine Tail Candidate 2"], the computing device may be configured to determine a partition index of a data set for tail candidate 2. Tail candidate 2 may be the partition index adjacent to a partition index of a data set that has a middle data key from the C_old and the C_new and that has a data key less than the middle data key. For example, assuming the C_old and the C_new equals 6 and 1 respectively, the partition index of the data set that is the middle data key is j of B(j) and the tail candidate 2 is the partition index adjacent to j that has a data key less than B(j). Block 332 may be followed by block 334.

In block 334, ["Compare Data Key At Tail Candidate 1 With Data Key at Tail Candidate 2"], the computing device may be configured to compare the data key at the tail candidate 1 with the data key at the tail candidate 2. When the data key at the tail candidate 1 is larger, block 334 may be followed by block 336. When the data key at the tail candidate 2 is larger, block 334 may be followed by block 340.

In block 336, ["Assign Tail Candidate 1 To First Final Partition Index"], the computing device may be configured to assign the tail candidate 1 to a first final partition index. Block 336 may be followed by block 338.

In block 338, ["Determine Second And Third Final Partition Indexes"], the computing device may be configured to determine a second and a third final partition indexes. The second final partition index may be the partition index of the data set that is the middle data key from the C_old and the C_new that resulted in a reversal in block 318. The third final partition index may be the partition index adjacent to the partition index of the data set that has the lowest data key from the C_old and the C_new and that has a data key larger than the lowest data key. For example, when the C_old equals 6 based on C(k)>B(j)>A(i) at a previous partition index and the C_new equals 1 based on A(i)>B(j)>C(k) at an updated partition index, the A(i) at the previous partition index is compared to C(k) at the updated partition index to determine which is smaller. The partition index adjacent to the partition index with the smaller data key that has a data key larger than the smaller data key is selected as the third final partition index.

In block 340, ["Assign Tail Candidate 2 To First Final Partition Index"], the computing device may be configured to assign the tail candidate 2 to a first final partition index. Block 340 may be followed by block 342.

In block 342, ["Determine Second And Third Final Partition Indexes"], the computing device may be configured to determine a second and a third final partition indexes. The second final partition index may be the partition index adjacent to the tail candidate 1 that has a data key larger than the data key at the tail candidate 1. The third final partition index may be the partition index adjacent to the partition index of the data set that has the lowest data key from the C_old and the C_new and that has a data key larger than the lowest data key. For example, when the C_old equals 6 based on C(k)> B(j)>A(i) at a previous partition index and the C_new equals 1 based on A(i)>B(j)>C(k) at a current index, the A(i) at a previous partition index is compared to C(k) at an updated index to determine which is smaller. The partition index adjacent to the partition index with the smaller data key that has a data key larger than the smaller data key is selected as the third final partition index.

Referring now to FIG. 3C, in block 350, ["Determine Head Candidate 1"], the computing device may be configured to determine a partition index of a data set for head candidate 1. The head candidate 1 may be the partition index of the data set with the lowest data key of the partition indexes of the data sets with the highest data keys from the C_old and the C_new. For example, when the C_old equals 6 based on C(k)> B(j)>A(i) at a previous partition index and the C_new equals 1 based on A(i)>B(j)>C(k) at an updated partition index, the C(k) at the previous partition index is compared to A(i) at the updated partition index to determine which is smaller. The partition index with the smaller data key is selected as the head candidate 1. Block 350 may be followed by block 352.

In block 352, ["Determine Head Candidate 2"], the computing device may be configured to determine a partition index of a data set for head candidate 2. Head candidate 2 may be the partition index adjacent to a partition index of a data set that is a middle data key from the C_old and the C_new and that has a data key greater than the middle data key. For example, assuming the C_old and the C_new equal 6 and 1 respectively, the partition index of the data set that is the middle data key is j of B(j) and the head candidate 2 is the partition index adjacent to j that has a data key greater than B(j). Block 352 may be followed by block 354.

In block 354, ["Compare Data Key at Head Candidate 1 With Data Key at Head Candidate 2"], the computing device may be configured to compare the data key at head candidate 1 with the data key of head candidate 2. When the data key at head candidate 1 is larger, block 354 may be followed by block 356. When the data key at head candidate 2 is larger, block 354 may be followed by block 360.

In block 356, ["Assign Head Candidate 2 To First Final Partition Index"], the computing device may be configured to assign the head candidate 2 to a first final partition index. Block 356 may be followed by block 358.

In block 358, ["Determine Second And Third Final Partition Indexes"], the computing device may be configured to determine a second and a third final partition indexes. The second final partition index may be the partition index with the smallest data key that is compared with the head candidate 1 when the head candidate 1 has the largest data key from the C_old or the C_new. For example, when the C_old is C(k)>B(j)>A(i) and the head candidate 1 is k of C(k) then the second final partition index is i of A(i). The third final partition index may be a partition index adjacent to the head candidate 1 that has a data key less than the data key at the head candidate 1.

In block 360, ["Assign Head Candidate 1 To First Final Partition Index"], the computing device may be configured to assign the head candidate 1 to a first final partition index. Block 360 may be followed by block 362.

In block 362, ["Determine Second And Third Final Partition Indexes"], the computing device may be configured to determine a second and a third final partition index. The second final partition index may be the partition index with the smallest data key that is compared with partition index of the head candidate 1 when the partition index of the head candidate 1 has the largest data key from the C_old or the C_new. For example, when the C_old is C(k)>B(j)>A(i) and head candidate 1 is k of C(k) then the second final partition index is i of A(i). The third final partition index may be a partition index adjacent to the head candidate 2 that has a data key less than the data key at the head candidate 2.

As described, the method 300 may be used to determine a partition index for each of three sorted data sets. The partition indexes may be used by a computing device to partition each of three sorted data sets into first and second portions where each data value in each of the first portions of the corresponding data sets is greater in magnitude than each data value in each of the second portions of the corresponding data sets. In some embodiments, the computing device may partition each of three sorted data sets using a single processing thread. In these and other embodiments, the processing thread may be passed information concerning the three sorted data sets, such as a pointer to a beginning or ending index of each of the three sorted data sets. Additional information may also be passed to the processing thread, such as an initial partition index.

In some embodiments, the data elements in the data sets may have multiple data keys. In these and other embodiments, a first data key of the data elements may be used for comparison within the method 300. When the first data key of data elements are equal, additional comparisons of the additional data keys may be made within the method 300.

In other embodiments, the method 300 may be implemented on three sorted data sets to partition each of the three-sorted data sets into three portions. More generally, the described method 300 may be implemented on three sorted data sets to partition each of the three-sorted data sets into any number of portions. In these embodiments and others where the sorted data sets may be partitioned into more than two portions, the method 300 may be performed by a single processor multiple times to partition the data sets into portions. Alternately or additionally, the method 300 may be performed by more than one processor independently and/or in parallel. For example, if each of the sorted data sets are partitioned into three portions, a first processor may be configured to determine the partition indexes to form the first and second portions and a second processor may be configured to determine the partition indexes to form the third portions.

In some embodiments, determining the partition indexes to form the first and second portions and to form the third portions may be performed by the first and second processors, respectively, in parallel and in substantially overlapping time intervals. As another example, if each of the sorted data sets are partitioned into 100 portions, 99 different processors may be configured to determine the 99 partition indexes to form the 100 portions. Thus, the method 300 may be performed using numerous processor, such as 100, 200, 500, 1000, or more processors. The method 300 may be performed independently and/or in parallel by multiple processors because the method 300 involves reading and comparing the data values at the different indexes of the sorted data sets and not changing, alternating, or adjusting data values within the sorted data sets.

Some embodiments disclosed herein may include a computer storage medium having computer-executable instructions stored thereon that are executable by a computing device to perform operations including but not limited to those operations described with respect to method 300 of FIGS. 3A-3C, such as the operations illustrated by blocks 302, 304, 306, 308, 310, 312, 314, 316, 318, 320, 330, 332, 334, 336, 338, 340, 342, 350, 352, 354, 356, 358, 360, 362, or some combination thereof in FIGS. 3A, 3B, and 3C, and/or variations thereof.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For example, in some embodiments blocks 350-362 may not be performed to determine the heads of the second portions of the data sets. In some embodiments, blocks 330-342 may not be performed to determine the tails of the first portions of the data sets.

FIG. 4A illustrates three example data sets, data set A, data set B, and data set C, arranged in accordance with at least some embodiments described herein. Data set A contains 6 data elements arranged in descending order and is associated with an index value i. Data set B contains 6 data elements arranged in descending order and is associated with an index value j. Data set C contains 6 data elements arranged in descending order and is associated with an index value k. An example of the method 300 illustrated in FIGS. 3A-3C is now described with reference to the data set A, the data set B, and the data set C of FIG. 4A.

In block 302, the initial partition indexes are selected based on the number of data elements in the data sets. The initial partition indexes are selected as 1, where x=2 and 3x=6. Thus, i=j=k=1 where i is the partition index of the data set A, j is the partition index of the data set B, and k is the partition index of the data set C.

In block 304, the data keys at the initial partition indexes, A(1)=290, B(1)=260, and C(1)=265, are determined to not be equal, such that block 304 is followed by block 308. In block 308, the data keys from the data sets are compared based on the initial partition indexes and it is determined that A(1)=290>C(1)=265>B(1)=260. Block 308 is followed by block 310. In block 310, the C_old is set to 2. Block 310 is followed by block 312.

In block 312, the partition index i of data set A and the partition index j of the data set B is adjusted because data set A has the highest data key at a current partition index and data set B has the lowest data key at the current partition index. The partition indexes are adjusted so that i=2, j=0. The partition index of k is not adjusted because the data set C has the middle data key at the current partition index. Block 312 is followed by block 314. In block 314, the data keys from the data sets are compared based on the adjusted partition indexes and it is determined that B(0)=280>C(1)=265>A(2)=262. Block 314 is followed by block 316. In block 316, the C_new is set to 4. Block 316 is followed by block 318. In block 318, it is determined that a reversal occurred because the C_new equals 4 and the C_old equals 2. Block 318 may be followed by blocks 330 and/or 350. In this example, block 318 is followed by block 330.

In block 330, the partition index with the smallest data key (260) from the C_old is j=1 (B(1)=260) and the partition index with the smallest data key (262) from the C_new is i=2 (A(2)=262). Since the data key at i=2 of the data set A is larger than the data key at j=1 of the data set B, i=2 is thus determined to be the first tail candidate. Block 330 may be followed by block 332. In block 332, the partition index of the data set with the middle data key (265) in the C_old and the C_new is k=1. The partition index adjacent to k=1 that contains a data key less than the data key at k=1 is k=2, so k=2 is determined to be the second tail candidate. Block 332 may be followed by block 334. In block 334, the data key (262) at the tail candidate 1 of i=2 is determined to be greater than the data key (245) at the tail candidate 2 of k=2. Thus, block 334 may be followed by block 336.

In block 336, the first tail candidate i=2 is determined as the first final partition index and as the partition index of the data set A. Thus, the data element that contains the data key of 262 is the tail data element of the first portion of the data set A.

Block 336 may be followed by block 338. In block 338, the second final partition index may be k=1 because k=1 is the partition index of the data set with the middle data key in the C_old and the C_new. Thus, the data element that contains the data key of 265 is the tail data element of the first portion of the data set C. The partition index with the lowest data keys from the C_old and the C_new are determined to be i=2 and j=1. Of i=2 and j=1, j=1 has a lower data key. The partition index adjacent to j=1 that has a higher data key than j=1 is j=0. Thus, j=0 is the third final partition index and the data element that contains the data key of 280 is the tail data element of the first portion of the data set B. FIG. 4B illustrates an example partitioning of the three example data sets of FIG. 4A using the method 300, arranged in accordance with at least some embodiments described herein.

FIG. 5A illustrates three example data sets, data set A, data set B, and data set C, arranged in accordance with at least some embodiments described herein. Data set A contains 6 data elements arranged in descending order and is associated with an index value i. Data set B contains 6 data elements arranged in descending order and is associated with an index value j. Data set C contains 6 data elements arranged in descending order and is associated with an index value k. An example of the method 300 illustrated in FIGS. 3A-3C is now described with reference to the data set A, the data set B, and the data set C of FIG. 5A.

In block 302, the initial partition indexes are selected based on the number of data elements in the data sets. The initial partition indexes are selected as 2. Thus, i=j=k=2, where i is the partition index of data set A, j is the partition index of data set B, and k is the partition index of data set C.

In block 304, the data keys at the initial partition indexes, A(2)=180, B(2)=172, and C(2)=135, are determined to not be equal, such that block 304 is followed by block 308. In block 308, the data keys from the data sets are compared based on the initial partition indexes and it is determined that A(2)=180>B(2)=172>C(2)=135. Block 308 is followed by block 310. In block 310, the C_old is set to 1. Block 310 is followed by block 312.

In block 312, the partition indexes of the data set A and the data set C are adjusted because the data set A has the highest data key (180) at a current partition index and the data set C has the lowest data key (135) at the current partition index. The partition indexes are adjusted so that i=3, k=1. The partition index of j is not adjusted because the data set B has the middle data key (172) at the current partition index. Block 312 is followed by block 314. In block 314, the data keys from the data sets are compared based on the adjusted partition indexes and it is determined that B(2)=172>A(3)=170>C(1)=145. Block 314 is followed by block 316. In block 316, the C_new is set to 3. Block 316 is followed by block 318. In block 318, it is determined that a reversal did not occur because the C_new equals 3 and the C_old equals 1. Block 318 may be followed by block 320. In block 320, the C_new is set to the C_old so that the C_old equals 3. Block 320 may be followed by block 312.

In block 312, the partition indexes of the data set B and the data set C are adjusted because the data set B has the highest data value (172) at the current partition index and the data set C has the lowest data value (145) at the current partition index. The partition indexes are adjusted so that j=3, k=0. The partition index of i is not adjusted because the data set A has the middle data key (170) at the current partition index. Block 312 is followed by block 314. In block 314, the data keys from the data sets are compared based on the adjusted partition indexes and it is determined that B(3)=171>A(3)=170>C(0)=155. Block 314 is followed by block 316. In block 316, the C_new is set to 3. Block 316 is followed by block 318. In block 318, it is determined that a reversal did not occur because the C_new equals 3 and the C_old equals 3. Block 318 may be followed by block 320. In block 320, the C_new is set to the C_old so that the C_old equals 3. Block 320 may be followed by block 312.

In block 312, the partition indexes of the data set B and the data set C are adjusted because the data set B has the highest data value (171) at the current partition index and the data set C has the lowest data value (155) at the current partition index. The partition index of the data set B is adjusted so that j=4. Adjusting the partition index of the data set C would cause the partition index to fall outside the number of data keys in a data set. Thus, a random data key of +infinity may be associated with the data set for future comparisons of the data set C. The index of the random data key may be assigned −1 for exemplary purposes The partition index of i is not adjusted because data set A has the middle data key (170) at the current partition index. Block 312 is followed by block 314. In block 314, the data keys from the data sets are compared based on the adjusted partition indexes and it is determined that C(−1)=+inf>A(3)=170>B(4)=140. Block 314 is followed by block 316. In block 316, the C_new is set to 5. Block 316 is followed by block 318. In block 318, it is determined that a reversal occurred because the C_new equals 5 and the C_old equals 3. Block 318 may be followed by blocks 330 and 350. In this example, block 318 is followed by block 330 only.

In block 330, the partition index with the smallest data key (155) from the C_old is k=0 (C(0)=155) and the partition index with the smallest data key (160) from the C_new is j=4 (B(4)=140). Since the data key at k=0 of the data set C is larger than the data key at j=4 of the data set B, k=0 is thus determined to be the first tail candidate. Block 330 may be followed by block 332. In block 332, the partition index of the data set with the middle data key (170) in the C_old and the C_new is i=3. The partition index adjacent to i=3 that contains a data key less than the data key at i=3 is i=4, so i=4 is determined to be the second tail candidate. Block 332 may be followed by block 334. In block 334, the data key (155) at the tail candidate 1 of k=0 is determined to be smaller than the data key (160) at the tail candidate 2 of i=4. Thus, block 334 may be followed by block 340.

In block 340, the second tail candidate i=4 is determined as the first final partition index and as the partition index of the data set A. Thus, the data element that contains the data key of 160 is the tail data element of the first portion of the data set A. Block 340 may be followed by block 342. In block 342, the second final partition index may not exist because there is no partition index adjacent to the partition index of C(0) (tail candidate 1), that has a data key larger than the data key of C(0). The partition index with the lowest data keys from the C_old and the C_new are determined to be k=0 and j=4. Of k=0 and j=4, j=4 has a lower data key. The partition index adjacent to j=4 that has a higher data key than j=4 is j=3. Thus, j=3 is the third final partition index and the data element that contains the data key of 171 is the tail data element of the first portion of the data set B. FIG. 5B illustrates an example partitioning of the three example data sets of FIG. 5A using the method 300, arranged in accordance with at least some embodiments described herein.

Figure 6:
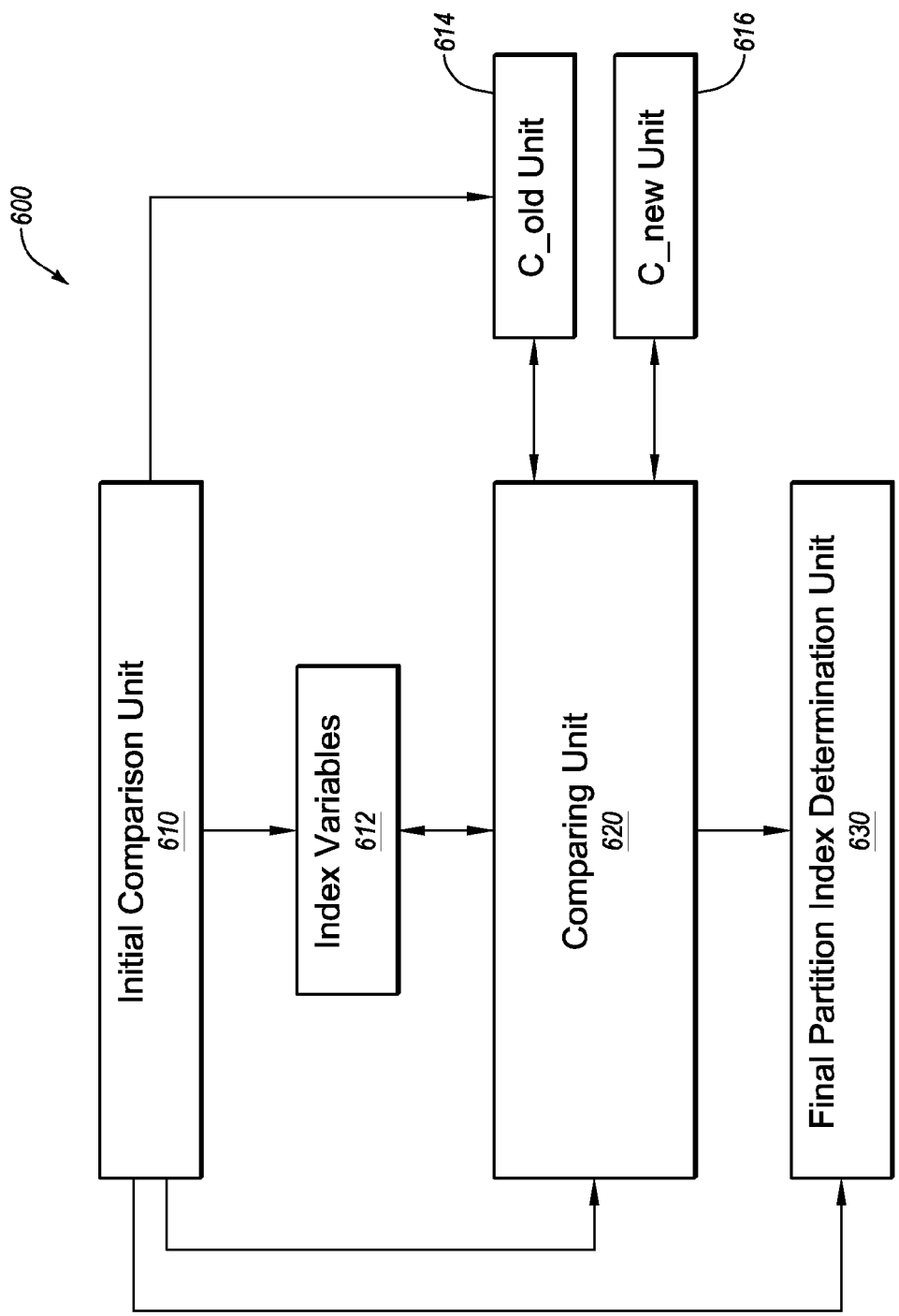
FIG. 6 illustrates an example system for implementing the method of FIGS. 3A-3C.

FIG. 6 illustrates an example system 600 for implementing the method 300 of FIGS. 3A-3C, arranged in accordance with at least some embodiments described herein. The system 600 may include an initial comparison unit 610, a comparing unit 620, a final partition index determination unit 630, and various memory units including an index variables unit 612, a C_old unit 614, and a C_new unit 616.

The system 600 may be configured to partition 3-pair aligned data sets (referred to herein as "data sets"), such as the data sets discussed with respect to FIGS. 1 and 3A-3C, into first and second portions. The initial comparison unit 610 may be configured to determine an initial partition index for each of the data sets. In some embodiments, the initial partition index may be the same for each data set or one or more of the data sets may have a different initial partition index. In some embodiments, the initial partition indexes may vary based on the number of data elements in the data sets and/or whether head data elements and/or tail data elements for the first and/or second portions respectively are being determined. After determining the initial partition indexes, the initial comparison unit 610 may send the initial partition indexes to the index variables unit 612.

The initial comparison unit 610 may further be configured to compare the data keys at the initial partition indexes to determine if the data keys are equal. When the data keys are equal, the initial comparison unit 610 may send the index variables to the final partition index determination unit 630. When the data keys are not equal, the initial comparison unit 610 may determine which of the data keys is the largest, the smallest, and the middle and send the information along with partition index variables that are associated with the data keys to the C_old unit 614. Further, when the data keys are not equal, the initial comparison unit 610 may adjust the partition indexes of the data sets with the largest and smallest data keys and send the adjusted partition indexes to the index variables unit 612. The initial comparison unit 610 may indicate to the comparing unit 620 to begin.

The comparing unit 620 may be configured to access the partition indexes from the index variables unit 612 and compare data keys from each of the data sets at the accessed partition indexes. The comparing unit 620 may determine which of the data keys is the largest, the smallest, and the middle and send the information along with index variables that are associated with the data keys to the C_new unit 616.

The comparing unit 620 may also be configured to determine when the data set with the largest key value in the C_old unit 614 is the data set with the smallest key value in the C_new unit 616 and when the data set with the smallest key value in the C_old unit 614 is the data set with the largest key value in the C_new unit 616. This may be referred to as a reversal.

When the comparing unit 620 determines that a reversal has occurred, the comparing unit 620 may be configured to so indicate to the final partition index determination unit 630. The comparing unit 620 may send to the final partition index determination unit 630 the information from the C_old unit 614 and the C_new unit 616 or some information derived therefrom. For example, in some embodiments, the comparing unit 620 may determine a reversal code indicating the type of reversal that occurred. For example, the reversal code may indicate which of the data sets changed data keys and which one of the data sets did not change its data key.

When the comparing unit 620 determines that a reversal has not occurred, the comparing unit 620 may be configured to set the C_old 614 equal to the C_new 616 and to adjust the partition indexes of the data sets with the largest and smallest data keys and send the adjusted partition indexes to the index variables unit 612. The comparing unit 620 may then repeat by accessing the partition indexes from the index variables unit 612, comparing the data keys from each of the data sets at the partition indexes, sending the information to the C_new unit 616, and determining if a reversal occurs.

The final partition index determination unit 630 may be configured to receive the information from the comparing unit 620, such as the reversal code, the information from the C_old unit 614 and the C_new unit 616, and/or other information. The final partition index determination unit 630 may be configured to use the information to determine tail candidates 1 and 2 and/or head candidates 1 and 2. Additionally, the final partition index determination unit 630 may be configured to determine the final partition indexes for the tail data elements and/or the head data elements based on the tail candidates 1 and 2 and/or head candidates 1 and 2. In some embodiments, when the final partition index determination unit 630 receives a reversal code from the comparing unit 620, the final partition index determination unit 630 may have different sections that may handle each of the different possible reversal codes.

The final partition index determination unit 630 may also be configured to receive the indication that the data keys are all equal from the initial comparison unit 610. Based on this indication, the final partition index determination unit 630 may determine that the final partition indexes are equal to the initial partition indexes.

Figure 7:
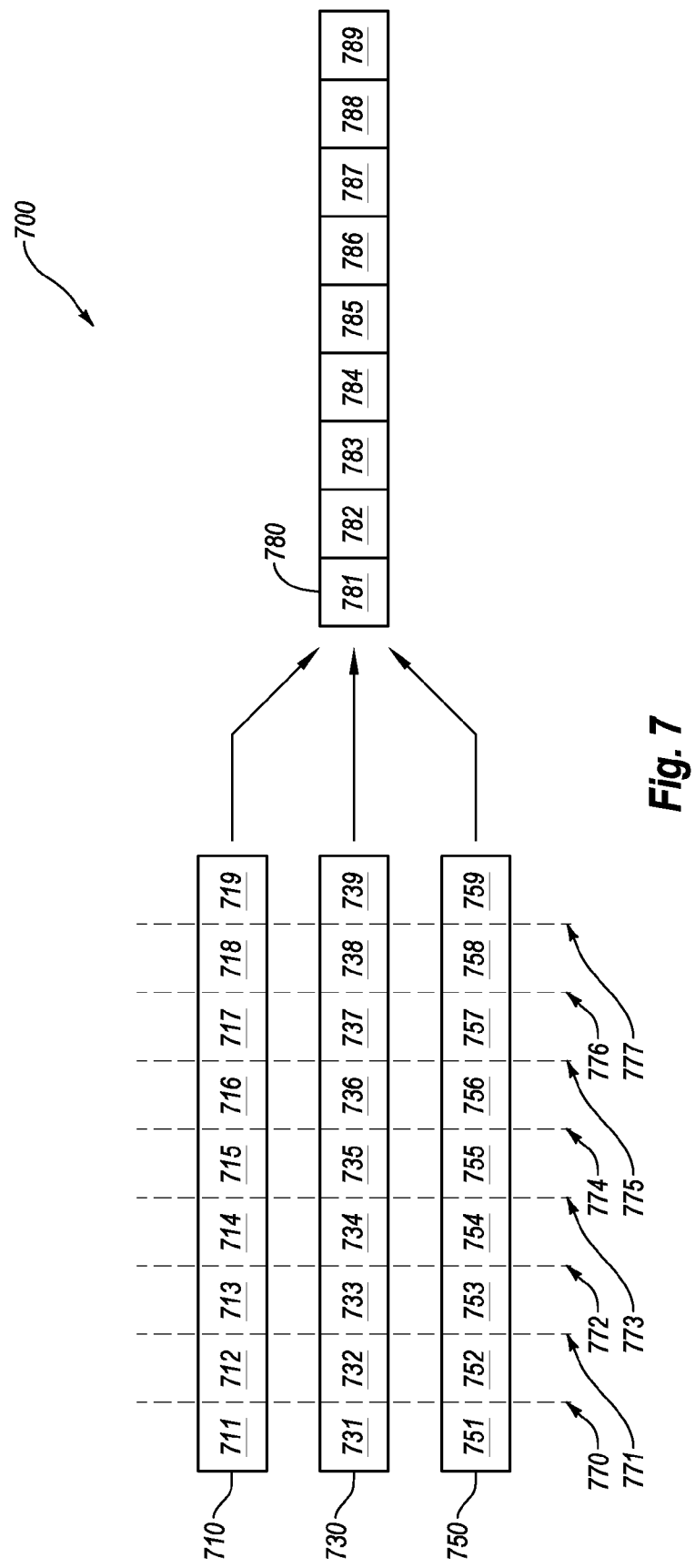
FIG. 7 illustrates an example merge of three example data sets.

FIG. 7 illustrates an example merge 700 of three example data sets, arranged in accordance with at least some embodiments described herein. The merge 700 occurs of three data sets 710, 730, 750 that are combined into a merged data set 780. The data sets 710, 730, 750 may be similar to the data sets 110, 130, 150 of FIG. 1A. The data sets 710, 730, 750 may each be aligned data sets that include various sorted data elements and that together may form a 3 pair aligned data set. The data sets 710, 730, 750 may each be divided into nine portions. Indexes 770-777 may be used as initial partition indexes to divide each of the data sets 710, 730, 750 into nine portions following the method described herein and illustrated in FIGS. 3A-3C. The index 770 may be equal to N/9 where N is the number of data elements in at least one of the data sets 710, 730, 750. The indexes 771-777 may be equal to 2N/9, 3N/9, 4N/9, 5N/9, 6N/9, 7N/9, and 8N/9, respectively.

Using the method described herein and illustrated in FIGS. 3A-3C, the data set 710 may be divided into portions 711-719, the data set 730 may be divided into portions 731-739, and the data set 750 may be divided into portions 751-759.

The portions 711, 731, and 751 may be sorted and combined to form a portion 781 of the merged data set 780. Likewise, portions 712, 732, 752 may be sorted and combined to form a portion 782 of the merged data set 780. Portions 713, 733, 753 may be sorted and combined to form a portion 783 of the merged data set 780. Portions 714, 734, 754 may be sorted and combined to form a portion 784 of the merged data set 780. Portions 715, 735, 755 may be sorted and combined to form a portion 785 of the merged data set 780. Portions 716, 736, 756 may be sorted and combined to form a portion 786 of the merged data set 780. Portions 717, 737, 757 may be sorted and combined to form a portion 787 of the merged data set 780. Portions 718, 738, 758 may be sorted and combined to form a portion 788 of the merged data set 780. Portions 719, 739, 759 may be sorted and combined to form a portion 789 of the merged data set 780.

The portions 781-789 are combined to form the merged data set 780. The merged data set 780 is a sorted combination of the three data sets 710, 730, 750. The combination of the data sets 710, 730, 750 using the method disclosed herein, where the time to divide the data sets 710, 730, 750 is disregarded, may take ⅑ of the time to form the merged data set 780 as compared to combining the data sets 710, 730, 750 using conventional methods, such as a quick sort method.

Although the data sets 710, 730, 750 are illustrated as being divided into 9 portions, depending on a number of data elements within the data sets 710, 730, 750, the data sets 710, 730, 750 may be divided into more or less portions. For example, the data sets 710, 730, 750 may be divided into 50, 100, or 1000 portions.

Figure 8:
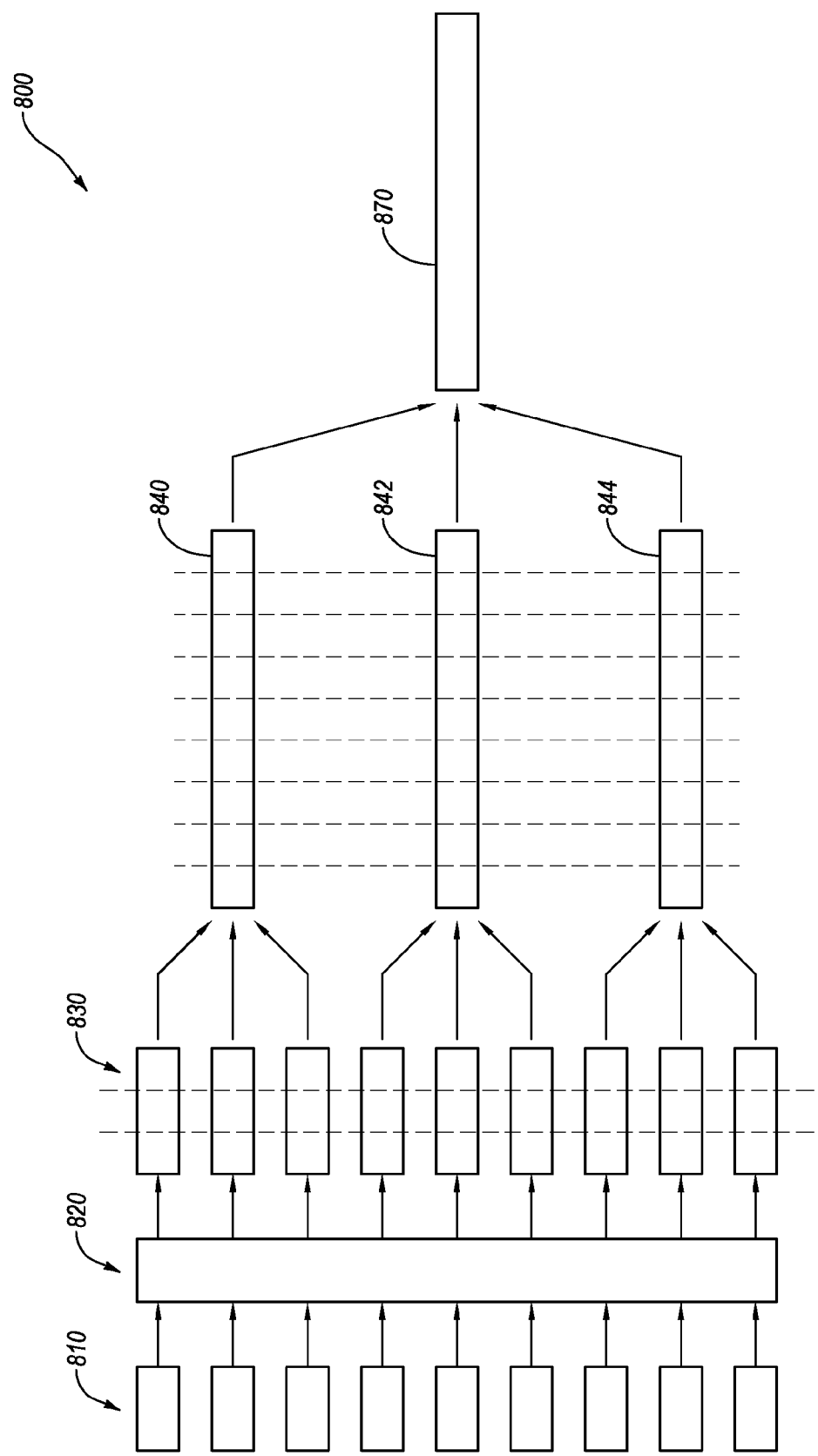
FIG. 8 illustrates an example merge of nine example data sets.

FIG. 8 illustrates an example merge 800 of nine data sets 810, arranged in accordance with at least some embodiments described herein. The nine data sets 810 may be formed from a non-sorted data set or may be nine separate data sets. The total number of data elements in the nine data sets 810 may be N. In some embodiments, each data set of the data sets 810 may have N/9 data elements. The nine data sets 810 may be sorted using a quick sort module 820. After sorting, the nine data sets 810 may form nine sorted data sets 830.

The nine sorted data sets 830 may be grouped together into 3 sets of 3-pair type aligned data sets. Two partitions indexes may be selected to divide the nine sorted data sets 830 each into three portions. The partition indexes may be (⅓)(N/9) and (⅔)(N/9). During a first stage, the portions of each set of the 3 pair type aligned data sets may be merged together as illustrated and described with respect to FIG. 7 to form data sets 840, 842, 844. For example, three sorted data sets of the nine sorted data sets 830 that form one of the 3 pair type aligned data sets may be partitioned, each of the corresponding portions from the three sorted data sets may be sorted and merged, and the merged portions may be merged to form one of the data sets 840, 842, or 844. Each of the merged portions may include N/9 data elements. In some embodiments, nine sets of threads may be used to perform a merge of three data sets in one set of 3 pair type aligned data sets. Six sets of threads may perform the sorting and merging after determining partition indexes for the three data sets. Three sets of threads may perform sorting and merging from the head of each of the three data sets during and after determining the partition indexes for the three data sets.

The data sets 840, 842, 844 may form a set of 3 pair aligned data sets. During a second stage, the data sets 840, 842, 844 may be merged together as illustrated and described with respect to FIG. 7 to form data set 870. The partition indexes for partitioning the data sets 840, 842, 844 into nine portions may be (⅑)(N/3), (²⁄₉)(N/3), (³⁄₉)(N/3), (⁴⁄₉)(N/3), (⁵⁄₉)(N/3), (⁶⁄₉)(N/3), (⁷⁄₉)(N/3), (⁸⁄₉)(N/3). Each of the merged portions may include N/9 data elements. In some embodiments, nine sets of threads may be used to perform a merge of data sets 840, 842, 844 into the data set 870. Eight sets of threads may perform the sorting and merging after determining partition indexes for the three data sets. One set of threads may perform sorting and merging from the head of each of the data sets 840, 842, 844 during and after determining the partition indexes for the data sets 840, 842, 844.

The data set 870 may be a sorted data set that includes the data elements from the nine data sets 810. To combine the nine data sets 810 into one sorted data set using conventional methods, such as a quick sort method, may have a processing time of Tqs(N), where N is the number of data elements in the nine data sets 810. The order of the processing time for the quick sort method may be $n\log_{2N}$. Thus, the processing time for a quick sort method increases in proportion to the number of elements being sorted.

The processing time for forming the data set 870 using the above described method may be much shorter. As described, the nine data sets 810 may be sorted in parallel and then merged together. Thus, the processing time may be equal to the time for sorting the nine data sets 810 and to perform the first and second stage of the merging as described above. The processing time to sort each of the nine data sets 810 in parallel may be equal to (⅑) the time required to sort the all of the data elements in the nine data sets 810 or Tqs(N/9). The processing time for performing the first stage of the merge may be equal to Tm(N/3). The processing time to perform the second stage of the merge may be equal to Tm(N). The processing times of Tm(N/3) and Tm(N) may be much shorter than the processing time for a quick sort because the position of a data element may be decided using two comparison operations where the position of a data element using quick sort requires many comparison operations. The combined processing time to perform the merge may be 4Tm(N/3). Thus the processing time for a quick sort is Tqs(N) where the processing time for the merge 800 is Tqs(N/9)+4Tm(N/3). Thus, the merge 800 may be performed in ⅙ the time as a quick sort operation. The above-described merge 800 may be applicable for merging 3, 9, 27, 81, or other power of 3 number of data sets. The above-described application may not be applicable for merging other numbers of data sets, such as 5, 7, 10, 12, or some other number.

Figure 9:
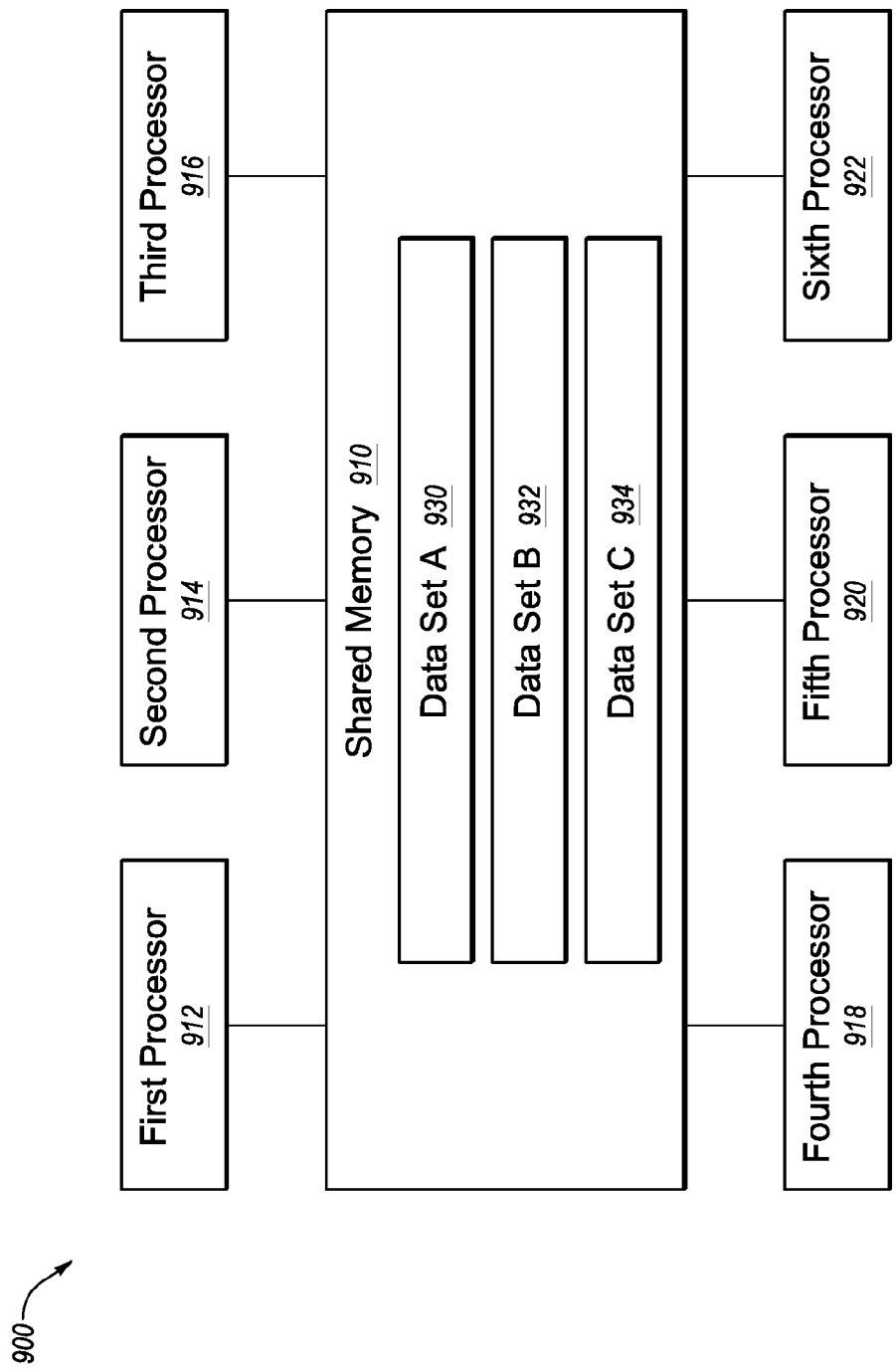
FIG. 9 illustrates an example system for partitioning data sets.

FIG. 9 illustrates an example system 900 for partitioning data sets, arranged in accordance with at least some embodiments described herein. The system 900 may include shared memory 910, a first processor 912, a second processor 914, a third processor 916, a fourth processor 918, a fifth processor 920, and a sixth processor 922. The shared memory 910 may include a data set A 930, a data set B 932, and a data set C 934.

Each of the processors 912, 914, 916, 918, 920, 922 may be configured to partition the data sets 930, 932, 934 in a single location. The processors 912, 914, 916, 918, 920, 922 may perform a method similar to the method described above with respect to FIGS. 3A-3C to partition the data sets 930, 932, 934. In some embodiments, the processors 912, 914, 916, 918, 920, 922 may be configured to partition the data sets 930, 932, 934 in parallel. For example, each of the processors 912, 914, 916, 918, 920, 922 may be configured to determine a partition index for each of the data sets 930, 932, 934 in substantially overlapping time intervals. In these and other embodiments, the processors 912, 914, 916, 918, 920, 922 may partition the data sets 930, 932, 934 in six locations to create seven portions for each of the data sets 930, 932, 934.

In some embodiments, fewer than all of the processors 912, 914, 916, 918, 920, 922 may determine a partition index for each of the data sets 930, 932, 934. In these and other embodiments, two of the processors 912, 914, 916, 918, 920, 922 may collaborate to determine a partition index for each of the data sets 930, 932, 934. For example, the first processor 912 may perform a portion of the partitioning of the data sets 930, 932, 934 by determining when a reversal occurs. The first processor 912 may then determine the tail data elements of a first portion of the data sets 930, 932, 934 and the second processor 914 may determine the head data elements of a second portion of the data sets 930, 932, 934.

The shared memory 910 may include instructions for performing a partition of the data sets 930, 932, and 934. Each of the processors 912, 914, 916, 918, 920, 922 may access the instructions. In some embodiments, one of the processors 912, 914, 916, 918, 920, 922, such as the first processor 912 may be configured to coordinate the partitioning of the data sets among the processors 912, 914, 916, 918, 920, 922. In these and other embodiments, the first processor 912 may be configured to determine initial partition indexes for each of the processors 912, 914, 916, 918, 920, 922. Alternately or additionally, the first processor 912 may be configured to receive an indication of when the processors 912, 914, 916, 918, 920, 922 have completed the partitioning of the data sets 930, 932, 934. Alternately or additionally, the first processor 912 may coordinate processing of separate portions of the data sets 930, 932, 934 produced by the partitioning of the data sets 930, 932, 934 in a manner similar to or different from that described with respect to FIGS. 2A and 2B.

In some embodiments, the processors 912, 914, 916, 918, 920, 922 may contain cache memory that may be used in partitioning the data sets 930, 932, 934. The processors 912, 914, 916, 918, 920, 922 may contain various kinds of mutual-exclusion mechanisms for using computer resources exclusively. Alternately or additionally, each processor 912, 914, 916, 918, 920, 922 may contain mechanisms for solving inconsistencies that may occur when sharing memory among the processors 912, 914, 916, 918, 920, 922.

Below is example pseudo code that may be used to perform a merge operation of nine data sets as illustrated and described above with respect to FIG. 8 using a system similar to the system 900 described above.

The pseudo code may use various functions such as a QS( ), MERGE3( ), and DIV_MERGE3( ) function. The function QS( ) may be designed to sort a data set using a quick sort mechanism when passed the head position of the data set and the number of data elements in the data set. The function MERGE3( ) may perform a 3 way merge of data sets when passed the position information of the data sets, the position information for the merged data set, and the number of data elements. The function DIV_MERGE3( ) may divide 3 pair type aligned data sets based on the method described in FIGS. 3A-3C and merge the 3 pair type aligned data sets based on the division when passed the head and end positions of the 3 pair type aligned data sets and an initial partition index. Each of the nine data sets that are merged are assigned a parameter list, such as parameter list-1, parameter list-2, that represents the information about each of the nine data sets that is used by the functions to perform the merge function.

In some embodiments, the pseudo-code may use a coding library such as a multi-platform shared-memory parallel programming library for programming in C, C++, Fortran, and other programming languages. In particular, the code below may use the syntax of OpenMP. OpenMP may allow for ease in performing functions in parallel when the functions are not written specifically for parallel processing, such as the functions described above.

In particular, the parallel syntax, sections syntax, and section syntax of OpenMP may be used to describe parallel execution of functions. In OpenMP, the blocks enclosed in the parallel syntax are performed in parallel. Additionally, the blocks enclosed in the sections syntax are each assigned to a thread. The section syntax specifically expresses the function that each thread executes.

```
(a) Description of a quick sort group
#pragma omp parallel {
#pragma omp sections {
#pragma omp section    { /* start of a section */
--;
QS(parameter list-1);
...
}   end of a section
#pragma omp section {
--;
QS(parameter list-9);
...;
}
}         /* end of sections */
}         /* end of parallel */
(b) Description of the First stage Merge Group
#pragma omp parallel {
#pragma omp sections {
#pragma omp section    {
---;
MERGE3 (parameter list1);
---
}         /* end of a section */
#pragma omp section {
---;
DIV_MERGE3(parameter list2);
--
}
#pragma omp section {
---;
DIV_MERGE3(parameter list3);
--
}
#pragma omp section {
--;
MERGE3(parameter list4);
---
}
#pragma omp section {
--;
DIV_MERGE3(parameter list5);
---
}
#pragma omp section {
---;
DIV_MERGE3 (parameter list6); --}
---
}
#pragma omp section {
MERGE3(parameter list7);
}
#pragma omp section {
--;
DIV_MERGE3(parameter list8);
--
}
#pragma omp section {
```

-continued

```
--;
DIV_MERGE3(parameter list9);
---
}       / end of section */
}      /* end of sections */
}      /* end of parallel */
(c) The Description of the 2nd Stage Merge Group
#pragma omp parallel {
#pragma omp sections {
#pragma omp section {
--;
MERGE3(parameter list-1);
--;
}
#pragma omp section {
--;
DIV_MERGE3(parameter list-2);
--
}
...
#pragma omp section {
--;
DIV_MERGE3(parameter list-9);
--
} /* end of sections */
} /* end of parallel */
```

Figure 10:
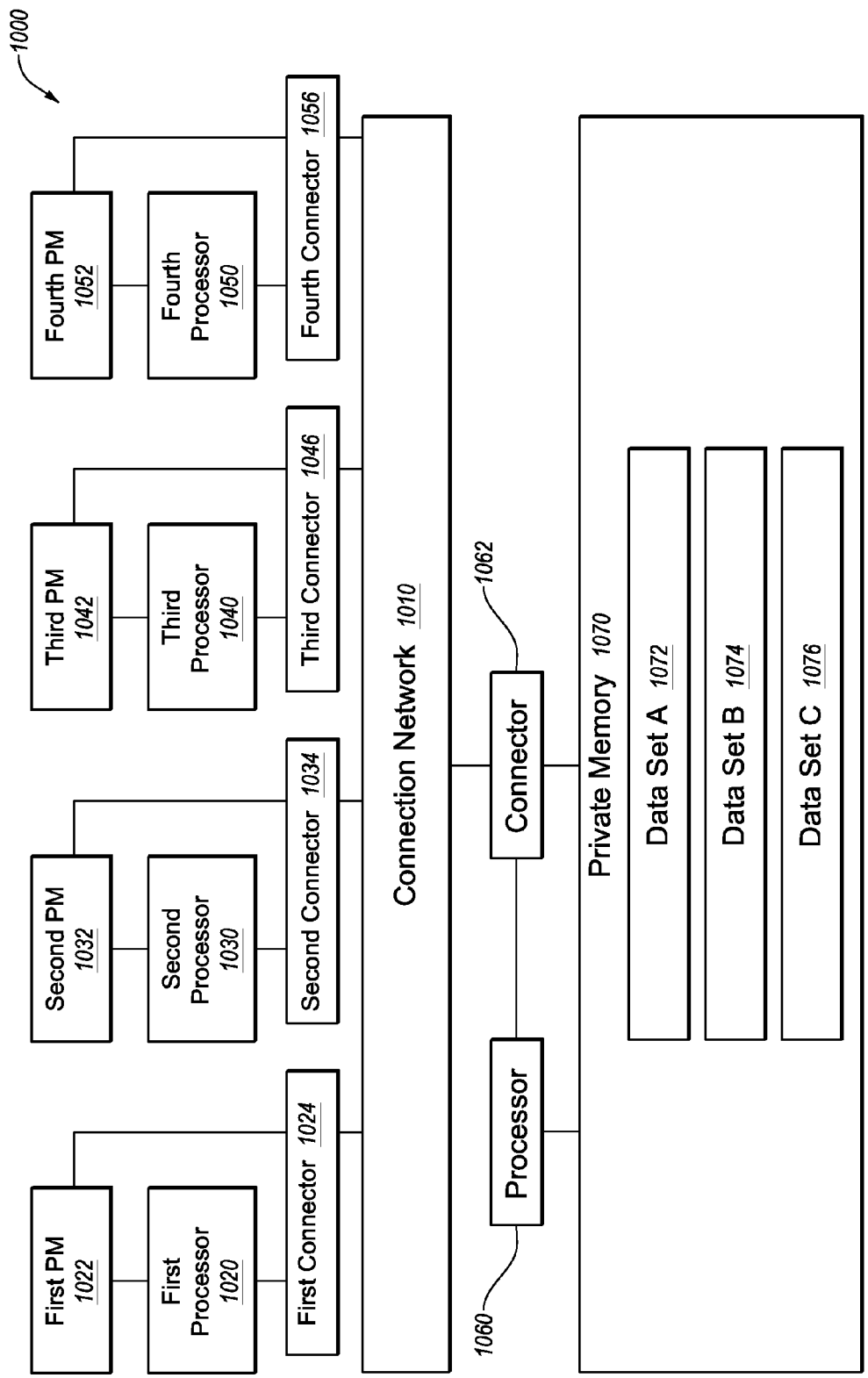
FIG. 10 illustrates another example system for partitioning data sets.

FIG. 10 illustrates another example system 1000 for partitioning data sets, arranged in accordance with at least some embodiments described herein. The system 1000 may include a connection network 1010, a first processor 1020 coupled to a first private memory (PM) 1022, a second processor 1030 coupled to a second PM 1032, a third processor 1040 coupled to a third PM 1042, a fourth processor 1050 coupled to a fourth PM 1052, a communications processor 1060, and a main PM 1070 that may include a data set A 1072, a data set B 1074, and a data set C 1076. The system 1000 may also include a first connector 1024 coupled between the connection network 1010 and the first processor 1020 and the first PM 1022, a second connector 1034 coupled between the connection network 1010 and the second processor 1030 and the second PM 1032, a third connector 1044 coupled between the connection network 1010 and the third processor 1040 and the third PM 1042, a fourth connector 1054 coupled between the connection network 1010 and the fourth processor 1050 and the fourth PM 1052, a connector 1062 coupled between the connection network 1010 and the processor 1060 and the private memory 1070.

The first connector 1024, the second connector 1034, the third connector 1046, the fourth connector 1056 and the connector 1062 may be configured to enable the processors 1020, 1030, 1040, 1050, 1060 and the PMs 1022, 1032, 1042, 1052, 1070 respectively to communicate over the connection network 1010.

Each of the processors 1020, 1030, 1040, 1050 may be configured to communicate with the main PM 1070 over the connection network 1010 by way of the connectors 1024, 1034, 1046, 1056 respectively. In some embodiments, the communications processor 1060 may facilitate communications between the main private memory 1070 and the processors 1020, 1030, 1040, 1050.

Each of the processors 1020, 1030, 1040, 1050 may be configured to partition the data sets 1072, 1074, 1076 in a single location. The processors 1020, 1030, 1040, 1050 may perform a method similar to the method described above with respect to FIGS. 3A-3C to partition the data sets 1072, 1074, 1076. In some embodiments, the processors 1020, 1030, 1040, 1050 may be configured to partition the data sets 1072, 1074, 1076 in parallel. For example, each of the processors 1020, 1030, 1040, 1050 may be configured to determine a partition index for each of the data sets 1072, 1074, 1076 in substantially overlapping time intervals. In these and other embodiments, the processors 1020, 1030, 1040, 1050 may partition the data sets 1072, 1074, 1076 in four locations to create five portions. To partition the data sets 1072, 1074, 1076, the processors 1020, 1030, 1040, 1050 may each request and receive the data sets 1072, 1074, 1076 from the main PM 1070 over the connection network 1010. Each of the processors 1020, 1030, 1040, 1050 may store the data sets 1072, 1074, 1076 in their respectively coupled PM 1022, 1032, 1042, 1052. In some embodiments, the processors 1020, 1030, 1040, 1050 may also receive instructions regarding partitioning the data sets 1072, 1074, 1076 from the main PM 1070 over the connection network 1010. Alternately or additionally, each of the PMs 1022, 1032, 1042, 1052 may contain instructions regarding partitioning the data sets 1072, 1074, 1076.

In some embodiments, the communications processor 1060 may be configured to coordinate the partitioning of the data sets among the processors 1020, 1030, 1040, 1050. In these and other embodiments, the communications processor 1060 may be configured to determine initial partition indexes for each of the processors 1020, 1030, 1040, 1050. Alternately or additionally, the communications processor 1060 may be configured to receive an indication of when the processors 1020, 1030, 1040, 1050 have completed the partitioning of the data sets 1072, 1074, 1076. Alternately or additionally, the communications processor 1060 may coordinate processing of separate portions of the data sets 1072, 1074, 1076 produced by the partitioning of the data sets 1072, 1074, 1076 in a manner similar to or different from that described with respect to FIGS. 2A and 2B.

Figure 11:
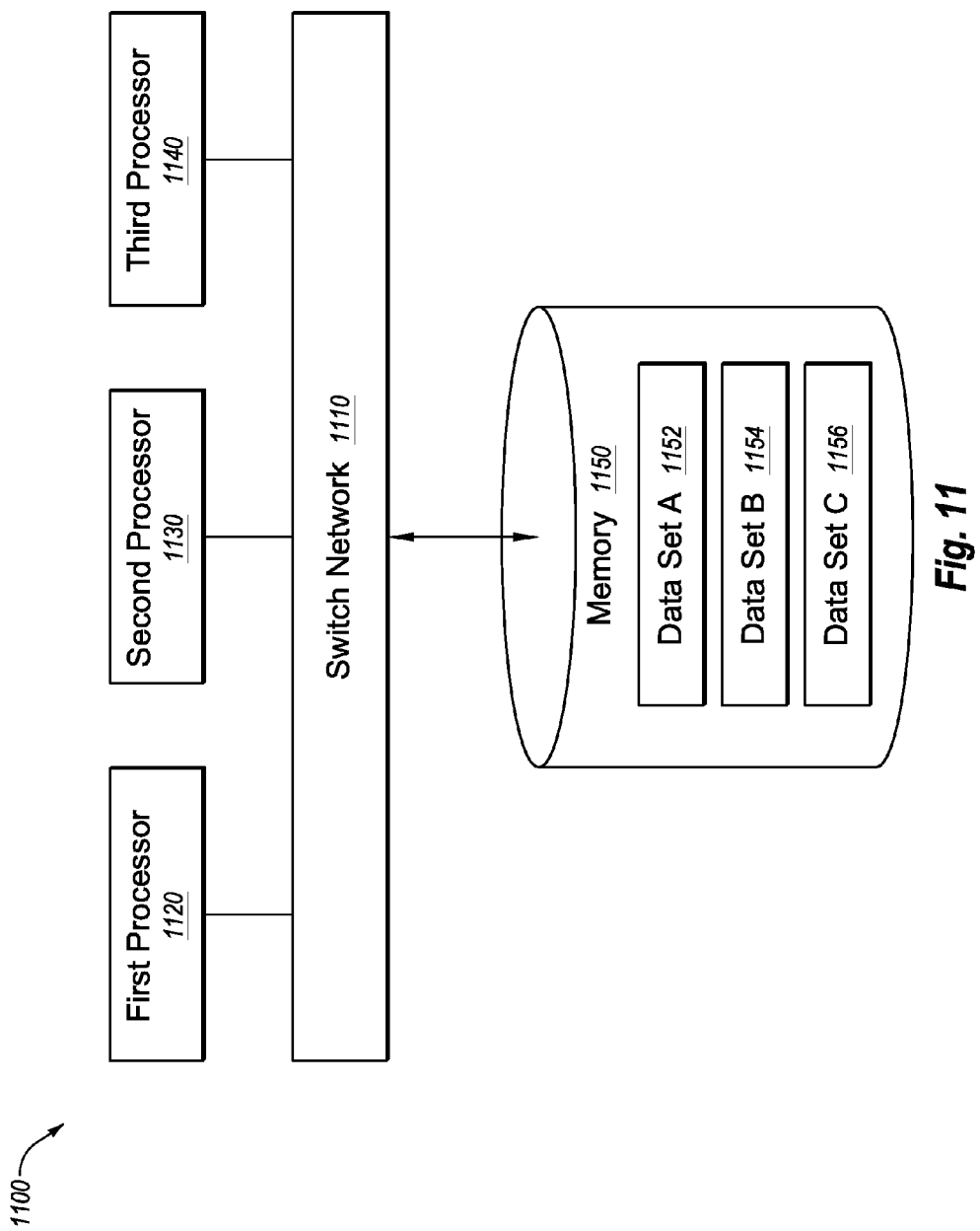
FIG. 11 illustrates another example system for partitioning data sets, all arranged in accordance with at least some embodiments described herein.

FIG. 11 illustrates another example system 1100 for partitioning data sets, arranged in accordance with at least some embodiments described herein. The system 1100 may include a switch network 1110, a first processor 1120, a second processor 1130, a third processor 1140, and a database 1150 that may include a data set A 1152, a data set B 1154, and a data set C 1156.

Each of the processors 1120, 1130, 1140 may be configured to communicate with the database 1150 by way of the switch network 1110. Each of the processors 1120, 1130, 1140 may be configured to partition the data sets 1152, 1154, 1156 in a single location. The processors 1120, 1130, 1140 may perform a method similar to the method described above with respect to FIGS. 3A-3C to partition the data sets 1152, 1154, 1156. The system 1100 may operate similar to the operation of the systems 900 and 1000 described herein with respect to FIGS. 9 and 10.

The present disclosure is not to be limited in terms of the particular embodiments described herein, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that the present disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub ranges and combinations of sub ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into sub ranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. A method to be performed by a computing system, the method comprising:
    comparing data values at an initial partition index for each of three sorted data sets to identify a first sorted data set of the three sorted data sets with a highest data value of the compared data values and a second sorted data set of the three sorted data sets with a lowest data value of the compared data values;
    adjusting the initial partition index for the first sorted data set to an adjusted initial partition index with a lower data value;
    adjusting the initial partition index for the second sorted data set to an adjusted initial partition index with a higher data value;
    comparing data values at the adjusted initial partition indexes of the first and second sorted data sets with the data value at the initial partition index of a third sorted data set of the three sorted data sets;
    determining a final partition index for each of the three sorted data sets based on the comparison of the data values at the adjusted initial partition indexes of the first and second sorted data sets;
    partitioning each of the three sorted data sets at their corresponding final partition index into a first portion and a second portion;
    processing the first portions of each of the three sorted data sets;
    processing the second portions of each of the three sorted data sets; and
    merging the processed first portions of the three sorted data sets with the processed second portions of the three sorted data sets.

2. The method of claim 1, wherein processing the first portions comprises combining and sorting the first portions and processing the second portions comprises combining and sorting the second portions.

3. The method of claim 1, wherein processing the first portions of each of the three sorted data sets and processing the second portions of each of the three sorted data sets occurs in substantially overlapping time intervals.

4. The method of claim 1, wherein processing the first portions of each of the three sorted data sets and processing the second portions of each of the three sorted data sets are performed by separate processor systems.

5. The method of claim 4, wherein the separate processor systems are separate processor cores in a multiple processor core.

6. The method of claim 1, further comprising:
   determining a second final partition index for each of the three sorted data sets; and
   partitioning each of the three sorted data sets at their corresponding second final partition index to form a third portion;
   processing the third portions of each of the three sorted data sets; and
   merging the processed third portions with the merged first and second portions.

7. The method of claim 1, wherein each data value in each of the first portions of the three sorted data sets has a greater magnitude than each data value in each of the second portions of the three sorted data sets.

8. A method to be performed by a computing system, the method comprising:
   iterating over:
     comparing data values at an initial partition index for each of three data sets to identify a first data set of the three data sets with a highest data value of the compared data values and a second data set of the three data sets with a lowest data value of the compared data values;
     adjusting the initial partition index for the first data set to an adjusted initial partition index with a lower data value;
     adjusting the initial partition index for the second data set to an adjusted initial partition index with a higher data value;
     comparing data values at the adjusted initial partition indexes of the first and second data sets with the data value at the initial partition index of a third data set of the three data sets;
     determining a final partition index for each of the three data sets based on the comparison of the data values at the adjusted initial partition indexes of the first and second data sets;
     partitioning each of the three data sets at their corresponding final partition index into a first portion and a second portion; and
     merging a combination of the first portions with a combination of the second portions to create a merged data set, wherein the merged data set is one of the three data sets for a next iteration and another two of the three data sets for the next iteration are different from the three data sets of a current iteration.

9. The method of claim 8, wherein each iteration further includes:
   combining and sorting the first portions; and
   combining and sorting the second portions, wherein the merged data set is a merger of the combined and sorted first portions and the combined and sorted second portions.

10. The method of claim 8, wherein the merged data set is a first merged data set, wherein at least one of the other two of the three data sets for the next iteration is a second merged data set formed from another group of three data sets.

11. The method of claim 10, wherein processing to form the first merged data set and the second merged data set occurs in substantially overlapping time intervals.

12. The method of claim 10, wherein processing to form the first merged data set and processing to form the second merged data set occurs is performed by separate processor systems.

13. The method of claim 12, wherein the separate processor systems are separate processor cores in a multiple processor core.

14. The method of claim 8, wherein each iteration further includes:
   determining a second final partition index for each of the three data sets; and
   partitioning each of the three data sets at their corresponding second final partition index to form a third portion, wherein the merged data set is a merger of a combination of the third portions with the merged first and second portions.

15. The method of claim 8, wherein in each iteration, each data value in each of the first portions of the three data sets has a greater magnitude than each data value in each of the second portions of the three data sets.

16. A system to process data, the system comprising:
   a first processor unit configured to:
     partition each of a first plurality of sorted data sets; and
     merge the first plurality of sorted data sets based on the partitions of the first plurality of sorted data sets to generate a first merged data set; and
   a second processor unit configured to operate in parallel with the first processor unit, the second processor unit configured to:
     partition each of three sorted data sets; and
     merge the three sorted data sets based on the partitions of the three sorted data sets to generate a second merged data set;
   wherein the partition of the three sorted data sets includes:
     comparison of data values at an initial partition index for each of the three sorted data sets to identify a first data set of the three sorted data sets with a highest data value of the compared data values and a second data set of the three sorted data sets with a lowest data value of the compared data values;
     adjustment of the initial partition index for the first data set to an adjusted initial partition index with a lower data value;
     adjustment of the initial partition index for the second data set to an adjusted initial partition index with a higher data value;
     comparison of data values at the adjusted initial partition indexes of the first and second data sets with the data value at the initial partition index of a third data set of the three sorted data sets;
     determination of a final partition index for each of the three sorted data sets based on the comparison of the data values at the adjusted initial partition indexes of the first and second data sets; and
     partition of each of the three sorted data sets at their corresponding final partition index into a first portion and a second portion.

17. The system of claim 16, wherein either the first processor unit, the second processor unit, or both the first processor unit and the second processor unit are configured to merge the first merged data set and the second merged data set.

18. The system of claim 16, wherein the second processor unit operates in substantially overlapped time intervals with the first processor unit.

19. The system of claim 16, wherein the first processor unit includes one or more processors that are configured to operate in parallel and the second processor unit includes one or more processors that are configured to operate in parallel.

20. The system of claim 16, wherein the partition of the three sorted data sets further includes a partition of each of the three sorted data sets into a plurality of portions that include the first portion and the second portion, wherein the second merged data set is generated based on the plurality of portions.

21. The system of claim 16, wherein each data value in each of the first portions of the three sorted data sets has a greater magnitude than each data value in each of the second portions of the three sorted data sets.

* * * * *